US011677659B2

(12) United States Patent
Sidebottom et al.

(10) Patent No.: US 11,677,659 B2
(45) Date of Patent: Jun. 13, 2023

(54) OPTIMIZATION OF SEGMENT ROUTING-ENABLED MULTIPATH NETWORK

(71) Applicant: Juniper Networks, Inc., Sunnyvale, CA (US)

(72) Inventors: Gregory A. Sidebottom, Ottawa (CA); James Patrick Boyle, Durham, NC (US); Cyril Margaria, Dublin (IE)

(73) Assignee: Juniper Networks, Inc., Sunnyvale, CA (US)

( * ) Notice: Subject to any disclaimer, the term of this patent is extended or adjusted under 35 U.S.C. 154(b) by 10 days.

(21) Appl. No.: 17/446,375

(22) Filed: Aug. 30, 2021

(65) Prior Publication Data

US 2023/0062080 A1 Mar. 2, 2023

(51) Int. Cl.
*H04L 45/24* (2022.01)
*H04L 45/12* (2022.01)
*H04L 45/42* (2022.01)
*H04L 45/125* (2022.01)

(52) U.S. Cl.
CPC ............ *H04L 45/24* (2013.01); *H04L 45/123* (2013.01); *H04L 45/125* (2013.01); *H04L 45/42* (2013.01)

(58) Field of Classification Search
CPC ........ H04L 45/24; H04L 45/123; H04L 45/42
See application file for complete search history.

(56) References Cited

U.S. PATENT DOCUMENTS

| 8,693,374 | B1 | 4/2014 | Murphy et al. |
| 9,450,817 | B1 | 9/2016 | Bahadur et al. |
| 9,794,165 | B1 | 10/2017 | Wood |
| 10,326,830 | B1* | 6/2019 | Singh ................... H04L 12/4633 |
| 10,742,556 | B2 | 8/2020 | LaBerge et al. |
| 2003/0023751 | A1* | 1/2003 | Mouri ..................... H04L 45/24 709/244 |
| 2015/0131458 | A1* | 5/2015 | Scharf ................... H04L 45/123 370/252 |

(Continued)

FOREIGN PATENT DOCUMENTS

WO 2013184846 A1 12/2013

OTHER PUBLICATIONS

Filsfils et al., "Segment Routing Architecture," Internet Engineering Task Force (IETF), RFC 8402, Jul. 2018, 32 pp.

(Continued)

*Primary Examiner* — Abdulkader M Alriyashi
(74) *Attorney, Agent, or Firm* — Shumaker & Sieffert, P.A.

(57) ABSTRACT

Techniques are described for optimizing multipaths of a segment routing-enabled network. For example, a computing device is configured to: for each link in a network layer of a multi-layer network, compute a usage (metric) of the link by all paths of a first plurality of multipaths provisioned in the network layer to compute a total usage by the first plurality of multipaths, the first plurality of multipaths having been computed and placed to a model of the network layer in a first order; compute a second plurality of multipaths, wherein the second plurality of multipaths are computed and placed, to the model of the network layer, in a second, different order; and in response to determining that the total usage by the second plurality of multipaths is less than the total usage by the first plurality of multipaths, provision the second plurality of multipaths in the network layer.

20 Claims, 8 Drawing Sheets

(56) References Cited

U.S. PATENT DOCUMENTS

| | | | |
|---|---|---|---|
| 2015/0156106 A1* | 6/2015 | Allan | H04L 45/24 370/238 |
| 2016/0191370 A1* | 6/2016 | Wood | H04L 41/122 370/238 |
| 2018/0097725 A1 | 4/2018 | Wood et al. | |
| 2020/0076719 A1 | 3/2020 | Filsfils et al. | |

OTHER PUBLICATIONS

Filsfils and Sivabalan et al., "Segment Routing Policy Architecture," Spring Working Group, Ver. 6, Dec. 14, 2019, 36 pp.

Filsfils and Talaulikar et al., "SR Policy Implementation and Deployment Considerations," Spring Working Group, Ver. 4, Oct. 9, 2019, 24 pp.

Extended Search Report from counterpart European Application No. 21209663.0 dated May 13, 2022, 14 pp.

Filsfils et al., "Segment Routing Policy for Traffic Engineering", Spring Working Group, Internet Engineering Task Force (IETF), Standard Working Draft, Internet Society (ISOC),, Rue Des Falaises, CH, 1205 G, Jun. 4, 2018, 49 pp.

Filsfils et al., "SR Traffic-Engineering Acknowledgements", Dec. 31, 2017, pp. 1-186, Retrieved from the Internet: URL: https://www.segment-routing.net/images/SRTE_TOI_dev_v20a_EXTERNAL.pdf.

* cited by examiner

OPTIMIZATION OF SEGMENT ROUTING-ENABLED MULTIPATH NETWORK

TECHNICAL FIELD

The invention relates to computer networks and, more specifically, to segment routing for computing networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, such as routers, use routing protocols to exchange and accumulate topology information that describes available routes through the network. This allows a router to construct its own routing topology map of the network. Upon receiving an incoming data packet, the router examines information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks use label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may employ segment routing techniques to leverage the Source Packet Routing in Networking (SPRING) paradigm. With segment routing, a head-end network node can steer a packet flow along any path be augmenting the header of a packet with an ordered list of segments identifiers for implementing a segment routing policy. Segment routing can reduce, and in some cases eliminate, intermediate per-flow states that are inherent in conventional MPLS routing.

SUMMARY

In general, techniques are described for optimizing a segment routing-enabled multipath network. For example, a network may have a base transport layer (e.g., an optical network or other serving layer) and a logical or overlay network layer (e.g., Internet Protocol (IP) network or other client layer) routed on the transport layer. A network with multiple layers is referred to as a multi-layer network. The logical network of the multi-layer network includes routers such as layer 3 (L3) routers and layer 2 (L2) switches or L2/L3 switches that provide L2/L3 traffic forwarding services, such as traffic engineering via segment routing. For example, routers of the logical network may implement a segment routing policy to steer a packet flow along a path over one or more logical links in the logical network layer (e.g., IP links in an IP layer), which correspond to a path in the underlying transport network that includes one or more physical links. In this way, the logical network in effect is an overlay network "built on top of" the underlying transport network.

A controller may control routing and traffic engineering operations of the logical network and may also provide integrated control over allocation or utilization of transport devices within the transport network. In some examples, the controller may, based on traffic demands, compute and provision a multipath (e.g., a multipath implemented for a segment routing tunnel) to realize a segment routing policy. A network may compute and provision multipaths for multiple segment routing policies, often between the same sources and destinations. For a given segment routing policy, the controller may compute the multipath in the network layer in an initial order. Traffic demand for the multipath may then be "placed" to a model of the network layer along the multipath. The computation and placement of traffic to the multipath may be referred to herein as the "placement" of the multipath in the network layer. The controller may then provision the multipath in the network.

In accordance with the techniques described in this disclosure, the controller may provide optimization of a segment routing-enabled multipath network. For example, the controller may provide alternative ways to route paths of the multipaths (e.g., SR tunnels) that may result in less usage of a metric (e.g., bandwidth) than paths provisioned in the logical network. As one example, the controller computes and places a first plurality of multipaths (corresponding to respective segment routing policies) to a model of the network layer in a first order and may provision the first plurality of multipaths in the logical network. The controller computes a total usage of a metric (e.g., bandwidth) by the second plurality of multipaths. The controller computes and places a second plurality of multipaths (also corresponding to the respective segment routing policies) in a second, different order (e.g., based on heuristic algorithms and/or strategies), computes a total usage of the metric by the second plurality of multipaths. The controller may provision the second plurality of multipaths in the logical network if the total usage by the second plurality of multipaths is less than the total usage by the first plurality of multipaths. Alternatively, or additionally, if the total usage by the second plurality of multipaths is not less than the total usage by the first plurality of multipaths, the controller may leave the multipaths provisioned in the logical network unchanged and/or perform a next iteration of the heuristic algorithm and/or strategy.

The techniques may provide one or more technical advantages that realizes a practical application. For example, by computing and placing the plurality of multipaths that are provisioned in the network in a different order, the result may provide a plurality of multipaths that use less resources than the plurality of multipaths provisioned in the network layer, which may be caused by the order in which the paths of the multipaths were initially computed and provisioned within the network layer.

In an example, this disclosure describes a method comprising: by a computing system having a model of a multi-layer network comprising a network layer having a plurality of links, for each link of the plurality of links, computing a usage of a metric of the link by all paths of a first plurality of multipaths provisioned in the network layer to compute a total usage by the first plurality of multipaths, wherein the multipaths of the first plurality of multipaths have been computed and placed to a model of the network layer in a first order, and wherein the multipaths of the first plurality of multipaths correspond to different, respective segment routing policies; computing, by the computing system, a second plurality of multipaths for the respective segment routing policies, wherein computing the second plurality of multipaths comprises computing and placing, to the model of the network layer, the multipaths of the second plurality of multipaths in a second, different order; computing, by the computing system, for each link of the plurality of links, a usage of the metric of the link by all paths of the second plurality of multipaths to compute a total usage by the second plurality of multipaths; and in response to determining that the total usage by the second plurality of multipaths is less than the total usage by the first plurality of multipaths, provisioning, by the computing system, the second plurality of multipaths in the network layer.

In an example, this disclosure describes a computing device of a multi-layer network comprising a network layer having a plurality of links, comprising: a memory; and processing circuitry in communication with the memory, the processing circuitry and memory being configured to: for each link of the plurality of links, compute a usage of a metric of the link by all paths of a first plurality of multipaths provisioned in the network layer to compute a total usage by the first plurality of multipaths, wherein the multipaths of the first plurality of multipaths have been computed and placed to a model of the network layer in a first order, and wherein the multipaths of the first plurality of multipaths correspond to different, respective segment routing policies; compute a second plurality of multipaths for the respective segment routing policies, wherein computing the second plurality of multipaths comprises computing and placing, to the model of the network layer, the multipaths of the second plurality of multipaths in a second, different order; and in response to determining that the total usage by the second plurality of multipaths is less than the total usage by the first plurality of multipaths, provision the second plurality of multipaths in the network layer.

In an example, this disclosure describes a non-transitory computer-readable storage medium encoded with instructions that, when executed, cause one or more programmable processors to: for each link of a plurality of links of a network layer of a multi-layer network, compute a usage of a metric of the link by all paths of a first plurality of multipaths provisioned in the network layer to compute a total usage by the first plurality of multipaths, wherein the multipaths of the first plurality of multipaths have been computed and placed to a model of the network layer in a first order, and wherein the multipaths of the first plurality of multipaths correspond to different, respective segment routing policies; compute a second plurality of multipaths for the respective segment routing policies, wherein computing the second plurality of multipaths comprises computing and placing, to the model of the network layer, the multipaths of the second plurality of multipaths in a second, different order; and in response to determining that the total usage by the second plurality of multipaths is less than the total usage by the first plurality of multipaths, provision the second plurality of multipaths in the network layer.

The details of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
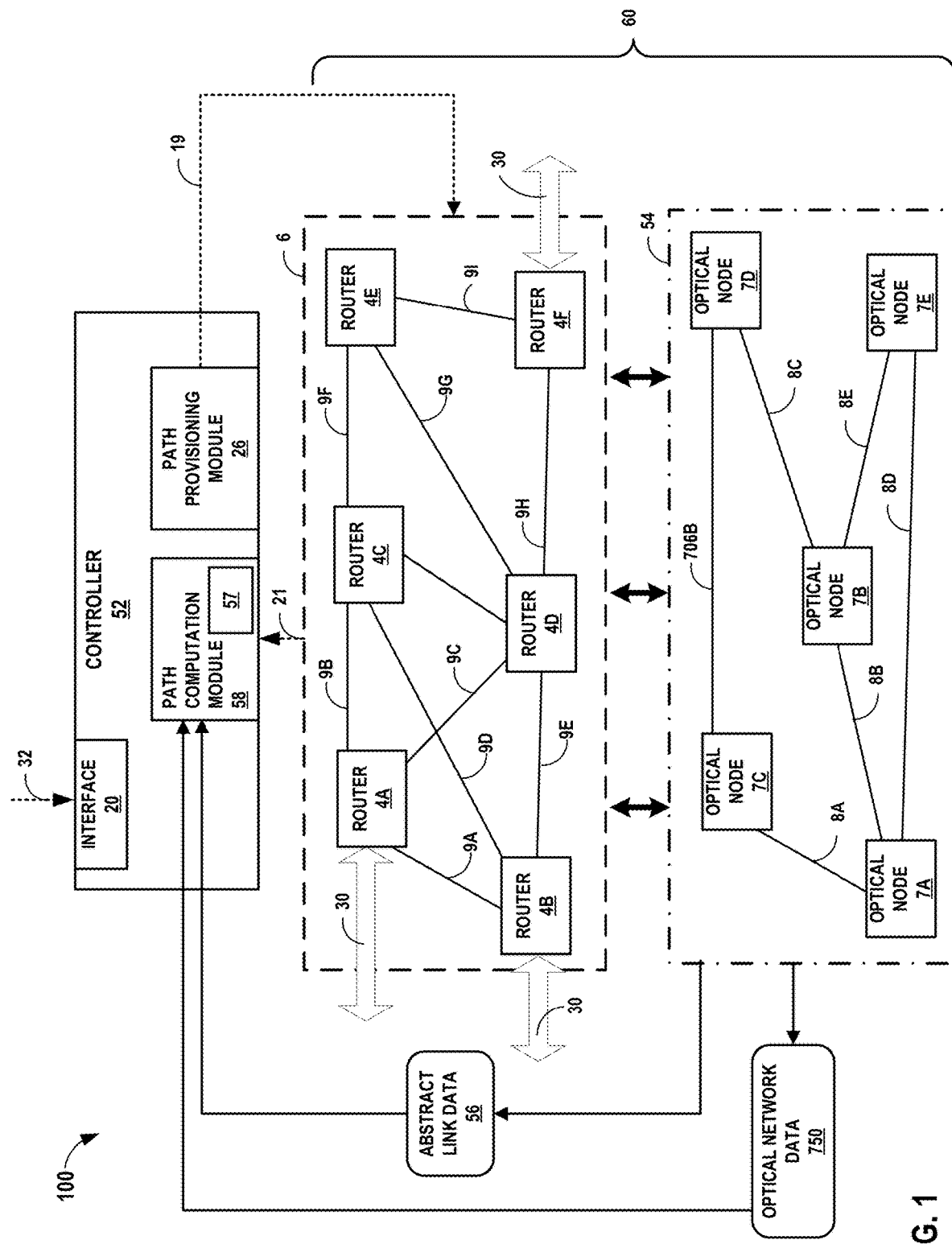
FIG. 1 is a block diagram illustrating an example system having a multi-layer network and controller configured to provide optimization of a segment routing-enabled multipath network, in accordance with techniques described in this disclosure.

FIG. 1 is a block diagram illustrating an example system 100 having a multi-layer network 60 and controller 52 configured to provide optimization of a segment routing-enabled multipath network, in accordance with techniques described in this disclosure. In the example of FIG. 1, multi-layer network 60 includes logical network layer 6 ("logical network 6") and transport network layer 54 ("transport network 54"). Transport network 54 represents, for example, an optical transport network (OTN) or other transport network underlying logical network 6. Transport network 54 transports, multiplexes, and switches packet-based communications through high-speed optical fiber links. Transport network 54 may include multiple optical communication devices (e.g., packet-optical transport devices), such as optical nodes 7A-7E (collectively "optical nodes 7"), interconnected via optical links 8A-8E (collectively "optical links 8"), respectively, and controlling transmission of optical signals carrying packet data along the optical links. In this way, transport network 54 provides a physical layer that physically interconnects routers 4A-4F (collectively "routers 4") of logical network 6.

Although not shown in FIG. 1 for simplicity, packet-optical transport devices may be, for example, PCXs, wavelength-division multiplexing (WDM)/dense WDM (DWDM), and time-division multiplexing (TDM)-based devices, optical cross-connects (OXCs), optical add-drop multiplexers (OADMs), reconfigurable OADMs (ROADMs), multiplexing devices, or other types of devices or other devices that transmit, switch and/or multiplex optical signals. As one example, routers 4 may be layer three (L3) routers optically connected by intermediate OXCs of transport network 54, such as OXCs to which the routers 4 have access links.

Transport network 54 typically includes a number of other components, such as amplifiers, transponders, OTTs, repeaters and other equipment for controlling transmission of optical packet data along optical links (also not shown). Large optical transport systems may have significant numbers of such devices that influence optical transmissions. Although described with respect to only optical links, transport system 54 may include other types of physical links as well, such as Ethernet PHY, Synchronous Optical Networking (SONET)/Synchronous Digital Hierarchy (SDH), Lambda, or other Layer 2 data links that include packet transport capability.

Logical network 6 includes routers 4 to control switching and routing of packet flows. Logical network 6 may represent an Internet Protocol (IP) network, for example. Examples of routers 4 include layer 3 (L3) routers and layer 2 (L2) switches or L2/L3 switches that collectively provide logical network 6. That is, logical network 6 typically provides L2/L3 traffic forwarding services, such as traffic engineering via Multiprotocol Label Switching traffic-engineered (MPLS-TE) including label switched paths (LSPs), Virtual Local Area Network (VLANs), and so forth. Various examples of logical network 6 may encompass many hundreds or even thousands of routers/switches.

Logical network 6 is in effect an overlay network "built on top of" underlying transport network 54. Routers 4 are connected by virtual or logical links (an example topology for which is illustrated in FIG. 1 with logical links 9A-9H (collectively "logical links 9")), each of which corresponds to a path in the underlying transport network 54. Each path may include one or more physical links of the transport network 54 (e.g., physical links 8).

In this example, routers 4 may employ segment routing (SR) techniques. Segment routing (SR), which may also be referred to as source packet routing or source packet routing in networking (SPRING), is a control-plane architecture that enables an ingress router to steer a packet through a specific set of network nodes and links in a network without relying on intermediate network nodes in the network to determine the path it should take. Fundamental to SPRING forwarding is the notion of Segment Identifiers (SIDs). Segment routing and SIDs are described in further detail in Filsfils & Previdi, ed., "Segment Routing Architecture," Internet Engineering Task Force (IETF) RFC 8402, July 2018; Sivabalan, ed., "Segment Routing Policy Architecture," SPRING Working Group, ver. 09, Nov. 1, 2020; and Talaulikar, ed., "SR Policy Implementation and Deployment Considerations," SPRING Working Group, ver. 04, Oct. 9, 2019; the entire contents of each of which are incorporated herein by reference. "Segment Routing Policy Architecture" defines an SR policy as "a framework that enables instantiation of an ordered list of segments on a node for implementing a source routing policy with a specific intent for traffic steering from that node."

Using segment routing, routers 4 forward network packets of packet flows from sources to destinations along segment routing paths that are encoded as lists of segment identifiers that augment network packet headers and are used by routers 4 for identifying the next segment to forward each network packets. For example, the ordered list of segments may be instantiated by an SR policy with a specific intent for traffic steering.

Sources of network packets received and forwarded by routers 4 may include one or more devices (not shown) and/or any public or private network or the Internet. The destinations of the network packets being forwarded by routers 4 may include one or more destination devices and/or network that may include LANs or wide area networks (WANs) that include a plurality of devices. For example, destination devices may include personal computers, laptops, workstations, personal digital assistants (PDAs), wireless devices, network-ready appliances, file servers, print servers or other devices that receive network packets from sources.

Segment routing has multiple types of segments. These include prefix segments that represent the shortest path (e.g., according to IGP metrics) between any of routers 4 and a specified prefix. Prefix segments include node segments, where the specified prefix identifies a particular router 4 (e.g., the loopback address of the particular router 4), and anycast segments, which enforced the Equal Cost Multipath (ECMP)-aware shortest path forwarding towards the closest router 4 of an anycast group. An anycast group includes one or more routers 4, and the specified prefix can be advertised by any of the routers 4 in the anycast group. A segment may be referred to by its Segment Identifier (SID).

Other segment types include adjacency segments (which are IGP adjacencies between routers 4), binding segments, and adjacency sets. A binding segment may represent a tunnel through routers 4. The tunnel may include an SR policy. An adjacency set represents multiple adjacencies and the same SID is used for the multiple adjacencies. This is the adjacency parallel version of anycast SID, where the same SID indicates for multiple nodes in the network. In general, SIDS that can be used to steer traffic simultaneously to multiple paths that give rise to preferable SID reduction or minimization solutions. Adjacency set SIDS and anycast SIDS are important such SIDS.

In some examples, routers 4 apply segment routing using a Multiprotocol Label Switching (MPLS) architecture. In such examples, each segment is encoded as an MPLS label and an SR Policy may be instantiated as a label stack appended to network packets. The active segment is on the top of the label stack. Upon completion of a segment, a router 4 pops the corresponding label from the label stack.

In some examples, routers 4 apply segment routing using an IPv6 architecture and the SR Header (SRH). In such examples, an instruction may be associated with a segment and encoded as an IPv6 address that maps to a SID. An SR Policy is instantiated as an ordered list of SIDS in the routing header. The Destination Address (DA) of the packet indicates the active segment. The SegmentsLeft (SL) pointer in the SRH indicates the next active segment. When a router 4 completes a segment, the router decrements the SL pointer and copies the next segment to the destination address. A network packet is steered on an SR Policy is augmented with the corresponding SRH for the SR Policy.

In some examples, routers 4 may operate as label switching routers (LSRs) to distribute labels to neighboring LSRs within network 6. For example, there may be multiple different label types including "adjacency" labels and "node" labels. Such labels may be or otherwise correspond to segment identifiers that locally or globally identify a segment in network 6. To forward a packet through network 6, routers 4 may push, pop, or swap one or more labels in a list of segment identifiers that is applied to the packet as it is forwarded through the network. The label stack may encode the topological and service source route of the packet under the SR policy.

An adjacency label may have a local semantic to a particular segment routing node, such as one of routers 4. In particular, an adjacency label steers traffic onto an adjacency (e.g., communication link and/or interface) or set of adjacencies. Thus, an adjacency label may be related to a particular router 4. To use an adjacency label, a particular router 4 may initially assign the adjacency label to a particular adjacency and advertise the adjacency label to other routers in the segment routing domain using an IGP, such as Intermediate System—Intermediate System (IS-IS) or Open Shortest Path First (OSPF). The particular router 4 may be the only network node in the SR domain to use the particular adjacency label. When a routers 4 forwards a packet using the adjacency label, the router 4 may cause the packet to use the adjacency for the particular routers 4 associated with the adjacency label. In this way, adjacency labels may be used to establish one-hop tunnels for segments.

A node label, by contrast, may have a global semantic within the SR domain. That is, each of routers 4 may be assigned a defined node label range (commonly referred to as Segment Routing Global Block (SRGB)) that is unique to each router 4 within the SR domain. An operator of network 6 may ensure unique allocation of the different node label ranges from a global range to different routers 4. In addition to a node label range, each particular router 4 may also have a specific node identifier that uniquely identifies the particular router 4 in the SR domain. Each router 4 may advertise its corresponding node identifier and node label range to other routers 4 in the SR domain using, e.g., using IGP.

Based on routes determined using, e.g., shortest path routing, each of routers 4 may configure its forwarding state to implement segment routing using MPLS or using an IPv6 architecture and the SR Header (SRH), as described above. Using MPLS for instance, each of routers 4 may perform path selection using topology information learned by way of IGP to compute a shortest path within network 6 on a hop-by-hop basis based on the routing information maintained by the routers 4. Each of routers 4 may then select a next hop along the locally computed shortest path and install forwarding information associated with the selected next hop in a forwarding plane of the network node, wherein the forwarding information identifies a network interface to be used when forwarding traffic and one or more labels to be applied when forwarding the traffic out the interface. The routers 4 use the next hops with the assigned labels to forward traffic hop-by-hop.

System 100 may implement segment routing using distributed or centralized control. With distributed control, routers 4 allocate and signal segments using routing protocols, such as IS-IS or OSPF or Border Gateway Protocol (BGP). A router 4 individually decides to steer packets on an SR Policy that is implemented using one or more paths. The router 4 individually computes the SR Policy. With distributed control, controller 52 may not be part of system 100. In the distributed control scenario, routers 4 are computing devices that may compute one or more lists of SIDs that satisfy each path of a plurality of paths for implementing an SR policy.

With centralized control, controller 52 allocates and signals segments. Controller 52 decides the routers 4 on which to steer packets mapped to SR policies. Controller 52 applies path computation to compute candidate paths for satisfying SR policies. In addition, controller 52 programs logical network 6, in particular routers 4, with forwarding information for implementing the candidate paths using lists of SIDs. Controller 52 may program routers 4 using Network Configuration Protocol (NETCONF), Path Computation Element Communication Protocol (PCEP), BGP, or other protocols. Controller 52 may represent one or more SR controllers and may be a WAN controller that is manages not just the SR domain but path computation, traffic engineering, provisioning, and other network control tasks for an operator of logical network 6. Controller 52 may discover the SIDs instantiated at the various routers 4 and discover the sets of local (SRLB) and global (SRGB) labels that are available at the various routers 4. Controller 52 may listen for other topology information using routing protocols.

In this example, controller 52 is a computing device that may compute one or more lists of SIDs that satisfy each path of a plurality of paths (referred to as "multipath") for implementing an SR policy. Each of the paths is from a source for the multipath to a destination for the multipath, and may be referred to herein as a segment routing tunnel. Controller 52 may compute the multipath from one or more sources to one or more destinations in order to realize the SR policy. For example, controller 52 may compute a multipath that meets one or more SR policies that each specifies a traffic demand (e.g., traffic demand 32) and a set of sources (e.g., routers 4A or 4B) and a set of destinations (e.g., router 4F). In some examples, controller 52 may compute a plurality of multipaths, each of the multipaths corresponding to different, respective segment routing policies.

Having computed the one or more lists of SIDs, controller 52 may then program logical network 6 to forward network traffic on a given multipath based at least on the one or more lists of SIDs. One or more lists of SIDs satisfy each path of a plurality of paths for implementing an SR policy when traffic forwarded by the routers 4 using a list of SIDs, from the one or more lists of SIDs, is forwarded along one of the paths and is not forwarded on a path that is not one of the paths. Moreover, the one or more lists of SIDs are satisfactory when they make complete use of the plurality of paths, i.e., routers 4 can forward traffic along any of the paths using the one or more lists of SIDs. For example, a first list of SIDs may cause a network packet steered to the SR policy to traverse a first path of the plurality of paths, while a second list of SIDs may cause a network packet steered to the SR policy to traverse a second path of the plurality of paths, or a single list of SIDs may cause a network packet steered to the SR policy to traverse both a first path and a second path of the plurality of paths. The routers can use weighted or non-weighted equal-cost multipath (ECMP) to forward traffic to a next segment and/or to select one of the one or more lists of SIDs.

In some example implementations, controller 52 provides integrated control over both routers 4 and packet-optical transport devices underlying transport network 54 with respect to transport of packet data through the optical links and other equipment. For example, controller 52 may not only control routing and traffic engineering operations of logical network 6 but may also provide integrated control over allocation or utilization of the optical spectrum and wavelengths utilized by each packet-optical transport device within transport network 54 that underlies the elements of logical network 6, or controller 52 may use the path or abstract link information from the transport layer to select candidate links for routing on the transport network 54.

Controller 52 may represent a high-level controller for configuring and managing logical network 6. Controller 52 may represent one or more general-purpose servers; an appliance, controller, or other special-purpose device for computing paths; an application executed by a computing device; a distributed control plane of routers 4 that computes paths for LSPs managed by the routers; and so forth. In some cases, aspects of controller 52 may be distributed among one or more real or virtual computing devices. Any such devices listed above may be in-network or out-of-network with regard to logical network 6. Example details of a software-defined networking (SDN) controller for a software-defined network, which may perform operations described herein to compute paths and route LSPs, are described in PCT International Patent Application PCT/US2013/044378, filed Jun. 5, 2013, and entitled, "PHYSICAL PATH DETERMINATION FOR VIRTUAL NETWORK PACKET FLOWS," which is incorporated by reference herein in its entirety. Additional examples details of an SDN controller for a software-defined network to obtain topology information for and to provision a network are described in U.S. patent application Ser. No. 14/042,614, filed Sep. 30, 2013, and entitled "SOFTWARE DEFINED NETWORK CONTROLLER," and U.S. patent application Ser. No. 14/500,736, filed Sep. 29, 2014, and entitled "BATCHED PATH COMPUTATION IN RESOURCE-CONSTRAINED NETWORKS," which are both incorporated by reference herein in their entireties.

Controller 52 may obtain traffic engineering information 21 for logical network 6 by executing one or more network routing protocols, extended to carry traffic engineering information, to listen for routing protocol advertisements that carry such traffic engineering information. Traffic engineering information may include node and interface identifiers for routers 4; administrative weights and available bandwidth per priority level for links; LSP identifier and state information for virtual links, and other information for computing paths for traffic engineered LSPs. Controller 52 may store traffic engineering information to a traffic engineering database (TED).

Controller 52 in this example presents northbound interface 20 that may be invoked by other controllers in a hierarchical arrangement of controllers or by an orchestrator, administrator, application, or other entity, to present traffic demands 32 for logical network 6. Interface 20 may be usable for integration with an orchestration system such as OpenStack; interface 20 may also or alternatively be usable by other applications or the operator's Operations Support Systems (OSS)/Business Support Systems (BSS). Interface 20 may in some cases present a RESTful Application Programming Interface (API). Interface 20 may further present GUIs/CLIs by which the network operator may access network management tools including, e.g., path computation module 58, to obtain information regarding the operations of multi-layer network 60 and to program multi-layer network 60.

Controller 52 includes path computation module 58 and, in some instances, a path provisioning module 26 to compute and provision paths, respectively, between path computation clients (e.g., routers) in a network. As further described below, path computation module 58 may intelligently compute and establish requested paths through the path computation domain (e.g., logical network 6). Upon computing paths, path computation module 58 schedules the paths for provisioning by path provisioning module 26.

For example, controller 52 determines a topology of network links 9 for logical network 6 by which routers 4 may switch network traffic flows 30 in order to meet the SR policy corresponding to the traffic flows 30. Controller 52 may determine the logical network topology for logical network 6 to ensure sufficient capacity of components of transport network 54 and to facilitate an optimized total resource cost to the logical network 6 for transporting the traffic. Controller 52 obtains a set of candidate links available for use as network links in logical network 6. Controller 52 additionally, in some instances, obtains abstract link data 56 describing the shared-risks encountered by these candidate links on their physical (transport) paths. In some cases, abstract link data 56 also defines the available candidate links and may define additional abstract links already configured and activated in logical network 6. Abstract link data 56 is, in other words and in such cases, the mechanism by which topology computation module 58 obtains the set of candidate links. Abstract link data 56 may further include information relevant to path optimization such as the physical length or delay of the link in some cases.

Abstract link data 56 in this way represents data "leaked" in some manner from the transport network 54 to controller 52 to enable the application of further constraints by controller 52 to the destination of paths and corresponding candidate links on which to route traffic. Such constraints may correspond to the types of abstract link data 56, which may include available candidate links, link lengths, link metrics (which may be based on link lengths), link costs (which may also be based on link lengths), and a list of Shared Risk Link Groups (SRLGs) for links. Information describing the candidate links may include available links and associated link metrics, link costs, and/or SRLGs on the link. The combination of topology information for logical network 6 and the obtained candidate links define a network topology model for logical network 6. The model may include a metric graph rooted at a source network node and shown alongside a paths tree representing the multipath.

Path computation module 58 decides the routers 4 on which to steer packets mapped to SR policies. Path computation module 58 applies path computation to compute candidate paths for satisfying an SR policy, such as a multipath, based on traffic engineering data 21 and/or abstract link data 56. The computed paths of a multipath may be placed to the model of the logical network layer 6 such that links 9 may be mapped to the paths of the multipath. Path computation module 58 then schedules the computed and placed paths for provisioning by path provisioning module 26, which in turn provisions the computed paths in the network.

In some examples, controller 52 may compute and provision a plurality of multipaths in logical network 6 corresponding to different, respective SR policies. The plurality of multipaths may be computed and placed to the model for logical network 6 in a particular order. Typically, controller 52 may compute and place the plurality of multipaths based on the order in which the SR policies are received. For instance, controller 52 may receive a first SR policy and compute a first multipath that meets the first SR policy. Controller 52 may place the traffic demand specified by the SR policy to the model for logical network 6. Controller 52 may receive a second SR policy and compute and place a second multipath to the model for logical network 6, and so on. However, in some examples, the computation and placement of the multipaths in an initial ("first") order may not result in the most efficient use of resources (e.g., bandwidth) by the multipaths provisioned in logical network 6. Assume for example controller 52 initially receives a first SR policy specifying a traffic demand (e.g., traffic demand 32) that corresponds to end-to-end traffic flow traversing logical network 6 from routers 4A or 4B to router 4F for non-priority traffic (e.g., low bandwidth traffic). Controller 52 computes and provisions a first plurality of multipaths corresponding to a first SR policy using one or more of links 9 of logical network 6. In this example, controller 52 may arbitrarily map one or more links 9 to implement the first plurality of multipaths for the non-priority traffic. In this example, the bandwidth usage of the links by the first plurality of multipaths may consume most (if not all) the available bandwidth for these links. If controller 52 subsequently receives a second SR policy that specifies a traffic demand that corresponds to another end-to-end traffic flow traversing logical network 6 from routers 4A or 4B to router 4F for the high-priority traffic (e.g., high bandwidth traffic), path computation module 58 may be unable to map certain links of the first plurality of multipaths to implement a second plurality of multipaths even though these links may be better suited for the second plurality of multipaths. As such, path computation module 58 may map a different one or more of links 9 to implement the second plurality of multipaths that may be less desirable for the high-priority traffic (e.g., high bandwidth traffic). Because the computation and placement of the first plurality of multipaths may occur prior to the computation and placement of the second plurality of multipaths, the paths of the second plurality of multipaths may be placed on less optimal paths. In these examples, it may be desirable to compute and place the paths of the multipaths in a different order, which may result in a better use of the resources by the multipaths.

In accordance with the techniques described in this disclosure, controller 52 may include an optimization module 57 to provide optimization of segment routing-enabled multipaths. Assume for example logical network 6 is provisioned with a first plurality of multipaths. In this example, optimization module 57 may compute a total usage of a metric (e.g., bandwidth) by the first plurality of multipaths provisioned in the logical network layer 6. For example, optimization module 57 may, for each of links 9 in logical network 6, compute a bandwidth usage of the link by all paths of the first plurality of multipaths provisioned in the logical network layer 6. For instance, optimization module 57 may obtain traffic engineering information 21 including information such as administrative weights and available bandwidth per priority level for links 9, and/or abstract link data 56 describing the shared-risks encountered by links 9 of paths provisioned in logical network 6 on their physical (transport) paths and/or information as to the physical length or delay of the links. Based on this information, optimization module 57 may determine the bandwidth usage of links 9 by all paths of the first plurality of multipaths provisioned in the logical network layer 6. In some examples, optimization module 57 may compute the total weighted bandwidth usage by the first plurality of multipaths by computing the ratio of the total bandwidth usage of links by the first plurality of multipaths and the total capacity of bandwidth of links used by the first plurality of multipaths.

As one example, link 9H is used to implement a multipath including a first path of router 4A, router 4D, and router 4F ("4A-4D-4F path"), and a second path of router 4B, router 4D, and router 4F ("4B-4D-4F path"). Link 9H may consume a fraction of the bandwidth contributed to the link (e.g., bandwidth capacity) for traffic placed on the 4A-4D-4F path, and may also consume another fraction of bandwidth contributed to the link for traffic placed on the 4B-4D-4F path. In this example, optimization module 57 may determine the total bandwidth usage of link 9H by the first path and the second path of the multipath, and may similarly determine the total bandwidth usage of other links of all paths of the multipath to determine the total bandwidth usage by the multipath. Alternatively, or additionally, optimization module 57 may compute the delay by the first plurality of multipaths. The total usage of the metric may include bandwidth, delay, or other metrics associated with the first plurality of multipaths.

Optimization module 57 may optimize the first plurality of multipaths provisioned in the network layer by computing and placing the multipaths in a different order (referred to herein as a "second plurality of multipaths"). For example, optimization module 57 may implement one or more heuristic algorithms and/or strategies to re-order the computation and placement of one or more paths of the first plurality of multipaths to a model of the logical network layer 6. The heuristic algorithms and/or strategies may include a greedy algorithm, a randomization function, or any other algorithm and/or strategy to re-order the computation and placement of multipaths, such as ordering the multipaths based on priorities assigned to the multipaths.

Because the order in which the paths are computed and placed in the logical network layer 6 may cause controller 52 to compute paths of the second plurality of multipaths with different links, this may result in different total usage of a metric by the second plurality of multipaths. In this example, optimization module 57 may compute, for each of links 9, a bandwidth usage of the link by all paths of the second plurality of multipaths to compute a total usage by the second plurality of multipaths. In some examples, optimization module 57 may compute a weighted bandwidth usage (e.g., the ratio of the total bandwidth usage by the second plurality of multipaths and the total capacity of bandwidth of links used by the second plurality of multipaths).

Optimization module 57 may then compare the total bandwidth usage by the second plurality of multipaths with the total bandwidth usage by the first plurality of multipaths. If the total bandwidth usage by the second plurality of multipaths is less than the total bandwidth usage by the first plurality of multipaths, then optimization module 57 may cause controller 52 to provision the second plurality of multipaths in logical network 6. If the total bandwidth usage by the second plurality of multipaths is not less than the total bandwidth usage by the first plurality of multipaths, then controller 57 may perform a next iteration of the heuristic algorithm and/or strategy and/or leave the multipaths provisioned in the logical network 6 unchanged. Additional examples of the optimization process is described in FIG. 2 below.

In some examples, optimization module 57 may assign respective priorities to one or more multipaths to optimize (or not optimize) the multipaths. For example, optimization module 57 may use a prioritizer module (not shown) to assign priorities to one or more multipaths provisioned in the logical network 6 to prevent any changes or modifications to these multipaths. Alternatively, or additionally, optimization module 57 may assign priorities to one or more multipaths provisioned in the logical network 6 to enable changes or modifications to the computation and placement of these multipaths.

In some examples, optimization module 57 may additionally, or alternatively, determine the quality of the multipaths. For example, multipaths that are computed and placed earlier to the model for logical network 6 may be more robust with respect to link failures (e.g., have many alternative paths), and the multipaths that are computed and placed later to the model for logical network 6 may be left with a smaller number of paths. In these examples, optimization module 57 may identify the multipaths with a larger number of paths from which optimization module 57 may move link bandwidth to multipaths with fewer paths or provide restrictions to the computation and placement of multipaths that occur earlier. For instance, optimization module 57 may compute and place all multipaths with an equitable distribution of resources and/or number of paths to avoid instances in which some multipaths have a larger number of paths and some multipaths have a smaller number (e.g., only one) of paths.

Figure 2:
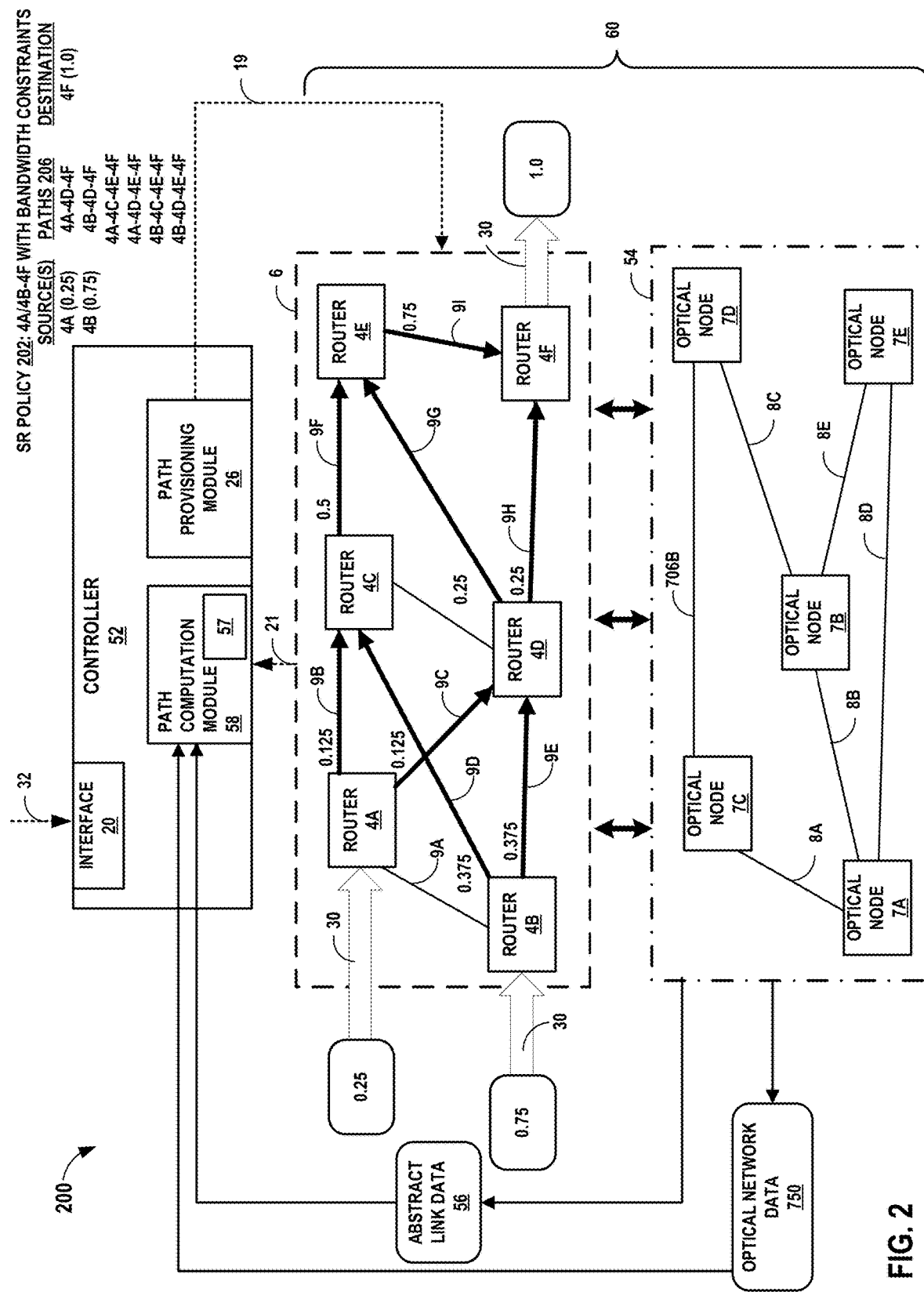
FIG. 2 is a block diagram illustrating an example system having a multi-layer network and controller configured to provide optimization of a segment routing-enabled multipath network, in accordance with techniques described in this disclosure.

FIG. 2 is a block diagram illustrating an example system 200 having a multi-layer network 60 and controller 52 configured to provide optimization of a segment routing-enabled multipath network, in accordance with techniques described in this disclosure. System 200 is an example implementation of system 100 of FIG. 1. For example, system 200 implements an SR policy 202 ("4A/4B-4F with bandwidth constraints") by computing and provisioning a first multipath in logical network 6 from source routers 4A and 4B to destination router 4F.

The first multipath provisioned in logical network 6 may include paths 206 from source routers 4A or 4B to destination router 4F. In this example, the paths 206 include a path of router 4A, router 4D, and router 4F ("4A-4D-4F path") over links 9C and 9H, respectively; a path of router 4B, router 4D, and router 4F ("4B-4D-4F path") over links 9E and 9H, respectively; a path of router 4A, router 4C, router 4E, and router 4F ("4A-4C-4E-4F path") over links 9B, 9F, and 9I, respectively; a path of router 4A, router 4D, router 4E, and router 4F ("4A-4D-4E-4F path") over links 9C, 9G, and 9I, respectively; a path of router 4B, router 4C, router 4E, and router 4F ("4B-4C-4E-4F path") over links 9D, 9F, and 9I, respectively; and a path of router 4B, router 4D, router 4E, and router 4F ("4B-4D-4E-4F path") over links 9E, 9G, and 9I, respectively. For ease of illustration, FIG. 2 is illustrated with a single multipath provisioned in logical network 6, but logical network 6 may be further provisioned with a plurality of multipaths corresponding to different, respective segment routing policies. The plurality of multipaths provisioned in logical network 6 may be referred to herein as a "first plurality of multipaths."

In accordance with the techniques described in this disclosure, controller 52 may include an optimization module 57 to provide optimization of segment routing-enabled multipaths. In this example, optimization module 57 may determine the total bandwidth usage by paths of multipaths (e.g., paths 206 of the first multipath and other paths of other multipaths), provisioned in network layer 6. In this example, optimization module 57 may obtain traffic engineering information 21 of links 9B, 9C, 9D, 9E, 9F, 9G, 9H, and 9I (collectively referred to as "paths links 9") and/or abstract link data 56 describing the shared-risks encountered by the paths links 9 on their physical (transport) paths and/or information as to the physical length or delay of the paths links 9. Based on this information, optimization module 57 may compute, for each of the paths links 9, a bandwidth usage of the link by all of paths 206 of the first plurality of multipaths to compute a total usage by the first plurality of multipaths. As one example, optimization module 57 may use the following function to compute the total usage of a link:

$$\text{LinkDir.use} = \Sigma(pm \in \text{LinkDir.PathMem})$$
$$pm.\text{BWFrac} * pm.\text{PathLinks.PathsOption.LinkDir.cap}$$

In the example above, "LinkDir.use" represents all uses of a directed link within the network layer (e.g., logical network 6) to implement the multipaths. "LinkDir.use" is computed, e.g., by the summation of all uses of bandwidth by the link for all paths of the multipath that use the link. For example, "pm" represents a path member (e.g., a particular path corresponding to an SR policy) and "LinkDir.PathMem" represents a particular link of the path. The bandwidth usage of the link is computed by the multiplication of the fraction of the bandwidth used by the link, e.g., "pm.BWFrac", and the bandwidth capacity of the link for all path options represented by "pm.PathLinks.PathsOption.LinkDir.cap".

To determine the total bandwidth usage of the path links 9 by all of paths 206 of the first multipath provisioned in logical network 6, optimization module 57 computes the bandwidth usage of each of the paths links 9. In the example of FIG. 2, the bandwidth usage of link 9B by paths 206 of the first multipath is computed by the bandwidth fraction of link 9B (e.g., 0.125) multiplied by the bandwidth capacity (e.g., 1 Gigabit (Gb) of traffic), which is a total bandwidth usage of 125 Megabytes (MB) for link 9B. Similarly, the bandwidth usage of link 9D by paths 206 of the first multipath is computed by the bandwidth fraction of link 9D (e.g., 0.375) multiplied by the bandwidth capacity, which is a total bandwidth usage of 375 MB for link 9D. The total bandwidth usage for each of the paths links 9 is computed and aggregated to compute the total bandwidth usage by the multipath provisioned in logical network 6. Optimization module 57 may similarly compute the total usage by other multipaths provisioned in logical network 6, as described above.

Optimization module 57 may optimize the multipaths provisioned in logical network 6 by computing and placing one or more paths of the first plurality of multipaths in a different order, referred to herein as a "second plurality of multipaths." For example, optimization module 57 may compute the second plurality of multipaths for the respective segment routing policies. For instance, optimization module 57 may compute and place, to the model of logical network 6, the paths of the second plurality of multipaths in a second, different order than the first plurality of multipaths. In some examples, optimization module 57 may implement one or more heuristic algorithms and/or strategies to re-order the computation and placement of one or more paths of multipaths provisioned in the network.

As one example, optimization module 117 may implement a greedy algorithm in which the optimization module 57 may compute and place the paths of the multipaths starting with the largest path (e.g., path with the highest bandwidth usage) to the smallest path (e.g., path with the lowest bandwidth usage). Optimization module 57 may then compute, for each of the paths links 9, a bandwidth usage of the link by all paths of the second plurality of multipaths to compute a total usage by the second plurality of multipaths.

Optimization module 57 may then determine whether the total bandwidth usage by the second plurality of multipaths is less than the total bandwidth usage by the first plurality of multipaths. If the total bandwidth usage by the second plurality of multipaths is less than the total bandwidth usage by the first plurality of multipaths, then optimization module 57 may cause controller 52 to provision the second plurality of multipaths in logical network 6. If the total bandwidth usage by the second plurality of multipaths is not less than the total bandwidth usage by the first plurality of multipaths, optimization module 57 may perform a next iteration of the greedy algorithm, e.g., compute and place the paths of the multipaths starting with the next largest path (e.g., path with the next highest bandwidth usage) to the smallest path (e.g., path with the lowest bandwidth usage) and determine whether the total bandwidth usage by the second plurality of multipaths is less than the total bandwidth usage by the first plurality of multipaths. In some examples, if the total bandwidth usage by the second plurality of multipaths is not less than the total bandwidth usage by the first plurality of multipaths and a given time limit has exceeded, the multipaths provisioned in logical network 6 are left unchanged.

Alternatively, or additionally, optimization module 117 may compute and place one or more paths of the second plurality of paths based on a random order. For example, optimization module 57 may select a subset of the paths of the multipaths provisioned in logical network 6, and then randomizes the order in which to compute and place the subset of paths. Optimization module 57 may then compute, for each of the paths links 9, a bandwidth usage of the link by all paths of the second plurality of multipaths to compute a total usage by the second plurality of multipaths.

Optimization module 57 may then determine whether the total bandwidth usage by the second plurality of multipaths is less than the total bandwidth usage by the first plurality of multipaths. If the total bandwidth usage by the second plurality of multipaths is less than the total bandwidth usage by the first plurality of multipaths, then optimization module 57 may cause controller 52 to provision the second plurality of multipaths in logical network 6. If the total bandwidth usage by the second plurality of multipaths is not less than the total bandwidth usage by the first plurality of multipaths, optimization module 57 may perform a next iteration of the random function, e.g., select another subset of the paths provisioned in logical network 6, and then randomizes the order in which to compute and place the subset of paths, and determine whether the total bandwidth usage by the second plurality of multipaths is less than the total bandwidth usage by the first plurality of multipaths. In some examples, if the total bandwidth usage by the second plurality of multipaths is not less than the total bandwidth usage by the first plurality of multipaths and a given time limit has exceeded, the multipaths provisioned in logical network 6 are left unchanged.

In some examples, optimization module 57 may assign respective priorities to one or more paths of the multipaths to optimize (or not optimize) the paths. For example, optimization module 57 may use a prioritizer module (not shown) to assign priorities to one or more multipaths provisioned in the logical network 6 to prevent any changes or modifications to these multipaths. For example, the multipath including paths 206 may be assigned a priority (e.g., as a high-priority multipath) to prevent any changes or modifications to the multipath. Alternatively, or additionally, optimization module 57 may assign priorities to one or more multipaths provisioned in the logical network 6 to enable changes or modifications to the computation and placement of these multipaths.

In some examples, if a greedy algorithm is used, the order in which to compute and place the paths may also be defined by the assigned priorities. For example, optimization module 57 may compute and place the paths of the multipaths starting with the highest-priority path to the lowest-priority path.

Figure 3:
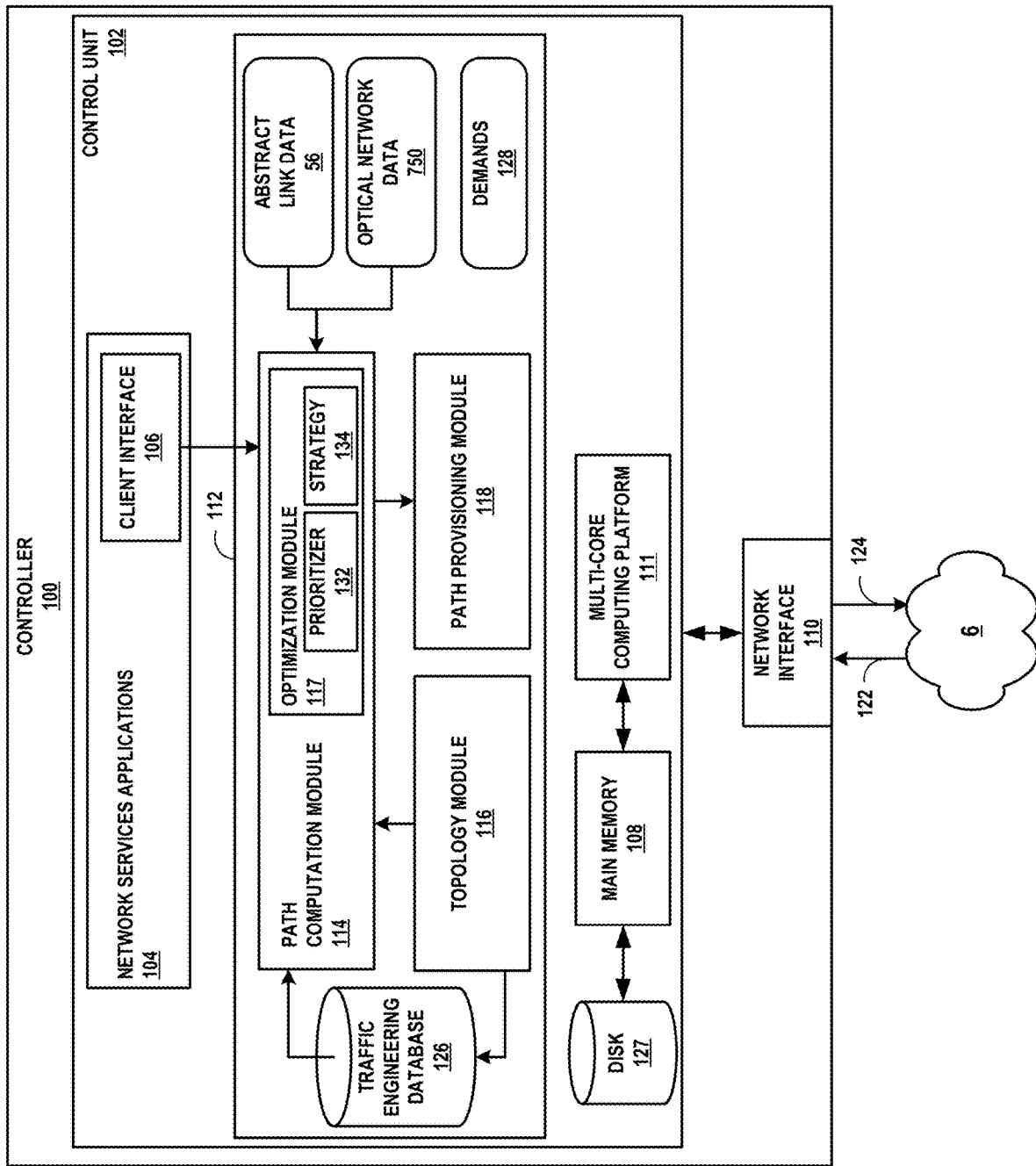
FIG. 3 is a block diagram illustrating an example controller, according to techniques of this disclosure.

FIG. 3 is a block diagram illustrating an example controller configured to provide optimization of segment routing-enabled multipaths, in accordance with techniques of this disclosure. In response to receiving demands, the controller 100 computes and outputs a logical network topology that meets the traffic demands for the logical network 6. Controller 100 may include a server or network controller, for example, and may represent an example instance of controller 52 of FIG. 1. In some instances, controller 100 may represent an example network management system that may not be capable of provisioning the paths, but is used by a network operator for network planning and analysis purposes. In such instances, controller 100 may not include path provisioning module 118 and may include an interface similar to interface 23 for outputting a representation of selected links for a solution.

Controller 100 includes a control unit 102 coupled to a network interface 110 to exchange packets with other network devices by one or more inbound links 122 and one or more outbound links 124. Main memory 108 of control unit 102 represents one or more computer-readable storage media, which may include random-access memory (RAM) such as various forms of dynamic RAM (DRAM), e.g., DDR2 SDRAM, or static RAM (SRAM), Flash memory, or any other form of fixed or removable storage medium that can be used to carry or store desired program code and program data in the form of instructions or data structures and that can be accessed by a computer. Main memory 108 provides a physical address space composed of addressable memory locations accessible by modules 112, 104.

Main memory 108 is coupled to disk 127, which may comprise computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store data and instructions.

Control unit 102 in this example includes multi-core computing platform 111 to execute modules 104, 112. Multi-core computing platform includes multiple processing cores that each includes an independent execution unit to perform instructions that conform to an instruction set architecture for the core. Cores of multi-core computing platform 111 may each be implemented as separate integrated circuits (ICs) or may be combined within one or more multi-core processors (or "many-core" processors) that are each implemented using a single IC (i.e., a chip multiprocessor).

Multi-core computing platform 111 executes software instructions, such as those used to define a software or computer program, stored to main memory 108. Alternatively or additionally, control unit 102 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 102 provides an operating environment for network services applications 104 and topology element 112. In some examples, these modules may be implemented as one or more processes executing on one or more virtual machines of one or more servers. That is, while generally illustrated and described as executing on a single controller 100, aspects of modules 104, 112 may be executed on other computing devices or on different virtual machines of one or more computing devices.

Network services applications 104 represent one or more processes that provide services to clients of a service provider network that includes logical network 6 and controller 100 to manage connectivity in the path computation domain. Network services applications 104 may provide, for instance, movie, television, or other media content distribution, Voice-over-IP (VoIP), Video-on-Demand (VOD), bulk transport, walled/open garden, IP Mobility Subsystem (IMS) and other mobility services, and Internet services to clients of a service provider network controlled at least in part by controller 100. Networks services applications 104 may issue demands to topology element 112 to request transport services of logical network 6. One or more of network services applications 104 may include or otherwise make use of a client interface 106 by which one or more client applications request transport services. Client interface 106 may represent a command line interface (CLI) or graphical user interface (GUI), for instance. Client interface 106 may also, or alternatively, provide an application programming interface (API) such as a web service to client applications.

Network services applications 104 may issue demands to topology element 112 to request respective paths in a path computation domain controlled by controller 100 from sources to destinations. For example, a demand may include a required bandwidth or other constraint and two endpoints representing a source and a destination that communicate over the path computation domain managed by controller 100. Control unit 102 stores demands as a list of demands in the demands 128 data structure ("demands 128"). In some cases, the service provider or other administrator of logical network 6 may configure, via an administrative interface, one or more demands 128. In some cases, topology element 112 may additionally or alternatively derive projected demands 128 based on patterns of demands previously experienced by logical network 6.

Topology element 112 accepts demands to route traffic between the endpoints for the demands over the path computation domain. Demands may be requested for different times and dates and with disparate bandwidth requirements. Topology element 112 may reconcile demands from network services applications 104 to multiplex requested paths for the corresponding traffic onto the logical network 6 path computation domain based on demand parameters and network resource availability.

To intelligently compute a topology for logical network 6, topology element 112 may in some cases include topology module 116 to receive traffic engineering information, such as traffic engineering information 21 of FIG. 1, describing available resources of logical network 6, including routers 4 and interfaces thereof and interconnecting network links 9. Topology module 116 may execute one or more southbound protocols, such as Open Shortest Path First with Traffic Engineering extensions (OSPF-TE), Intermediate System to Intermediate System with Traffic Engineering extensions (ISIS-TE), BGP Link State (BGP-LS), to learn traffic engineering information for logical network 6.

Traffic engineering database (TED) 126 stores traffic engineering information, received by topology module 116, for logical network 6 that constitutes a path computation domain for controller 100. TED 126 may include one or more link-state databases (LSDBs), where link and node data is received in routing protocol advertisements, received from a topology server, and/or discovered by link-layer entities such as an overlay controller and then provided to topology module 116. In some instances, the service provider or other administrative entity may configure traffic engineering or other topology information within TED 126 via an administrative interface.

Path computation module 114 of topology element 112 may compute paths that satisfy demands 128 for the network layer (e.g., logical network 6 of FIG. 1). Path computation module 114 may represent an example instance of path computation module 58 of FIG. 1. Path computation module 114 obtains abstract link data 56 describing candidate links for logical network 6 and the shared-risks encountered by these candidate links on their physical (transport) paths, as well as information relevant to path optimization such as the physical length or delay of the link in some cases. Abstract link data 56 may be stored in TED 126. In some examples, path computation module 114 obtains optical network data 750 for optical transport network 54. Optical network data 750 includes data descriptive of the optical equipment of optical transport network 54 and usable by controller 100 to determine the values of optical path impairments. Controller 100 may determine, based on optical network data 750, candidate links for routing in the logical network 6 that have feasible optical paths. Path computation module 114 may compute and place the paths mapped to the candidate links to a model of the network layer.

Path computation module 114 having selected and routed the candidate links for logical network 6, path provisioning module 118 attempts to set the routed paths for the candidate links onto logical network 6. Path provisioning module 118 of controller 100 may program the paths into logical network 6 to cause the state of logical network 6 to match the state of logical network 6 as determined by path computation module 114. Path provisioning module 118 may represent an example of path provisioning module 26 of FIG. 1. Provisioning a path may require path validation prior to committing the path to provide for packet transport. Path provisioning module 118 executes one or more southbound protocols for path provisioning to inject state into elements of logical network 6, such as any one or more of routers 4. A southbound protocol refers to a protocol by which components of controller 100 may communicate with network 6 elements, such as routers 4, to obtain or inject topology information, forwarding, and other network information that determines the operation of the logical network 6. For example, southbound protocols may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements, Simple Network Management Protocol (SNMP), and OpenFlow (or other SDN configuration protocol).

In accordance with the techniques described in this disclosure, path computation module 114 may include an optimization module 117 to provide optimization of segment routing-enabled multipaths in view of demands 128 (e.g., the first plurality of multipaths) by computing and placing one or more paths of the multipaths in a different order (e.g., the second plurality of multipaths), and provisioning the second plurality of multipaths if the total usage of a metric by the second plurality of multipaths is less than the total usage of the metric by the first plurality of multipaths. Optimization module 117 may represent an example of optimization module 57 of FIG. 1.

Optimization module 117 may use the data (e.g., traffic engineering information 21 and/or abstract link data 56) describing links used to implement paths of multipaths to determine a total usage of a metric (e.g., bandwidth) by multipaths provisioned in logical network 6. Optimization module 117 may compute, for each of the links used to implement paths of multipaths, the usage of the metric of the link by all paths of the multipaths to compute a total usage of the metric by the multipaths. As described above, optimization module 117 may implement one or more heuristic algorithms and/or strategies ("strategy 134") to define the order in which to compute and place of one or more paths of the multipaths. Strategy 134 may include algorithms and/or strategies such as a greedy algorithm, a randomization function, or any other algorithm and/or strategy to order the computation and placement of paths such as based on priorities assigned to the paths. Optimization module 117 may then compute the total usage by the second plurality of multipaths, and provision the second plurality of multipaths if the total usage of a metric by the second plurality of multipaths is less than the total usage of the metric by the first plurality of multipaths. If the total bandwidth usage by the second plurality of multipaths is not less than the total bandwidth usage by the first plurality of multipaths, then optimization module 117 may leave the multipaths provisioned in the logical network 6 unchanged and/or perform a next iteration of the heuristic algorithm and/or strategy.

In some examples, optimization module 117 includes a prioritizer module 132 to assign priorities to one or more paths of the multipaths to control which of the paths provisioned in the network layer are to be optimized (or not optimized). For example, optimization module 117 may use prioritizer module 132 to assign priorities to one or more paths of the multipaths provisioned in the logical network 6 to prevent any changes or modifications to these paths. Alternatively, or additionally, prioritizer module 132 may assign priorities to one or more paths of the multipaths provisioned in the logical network 6 to enable changes or modifications to the computation and placement of these paths.

In some examples, optimization module 117 may additionally, or alternatively, determine the quality of the multipaths. For example, multipaths that are computed and placed earlier to the model for logical network 6 may be more robust with respect to link failures (e.g., have many alternative paths), and the multipaths that are computed and placed later to the model for logical network 6 may be left with a smaller number of paths. In these examples, optimization module 117 may identify the multipaths with a larger number of paths from which optimization module 117 may move link bandwidth to multipaths with fewer paths or provide restrictions to the computation and placement of multipaths that occur earlier. For instance, optimization module 117 may compute and place all multipaths with an equitable distribution of resources and/or number of paths to avoid instances in which some multipaths have a larger number of paths and some multipaths have a smaller number (e.g., only one) of paths.

Figure 4:
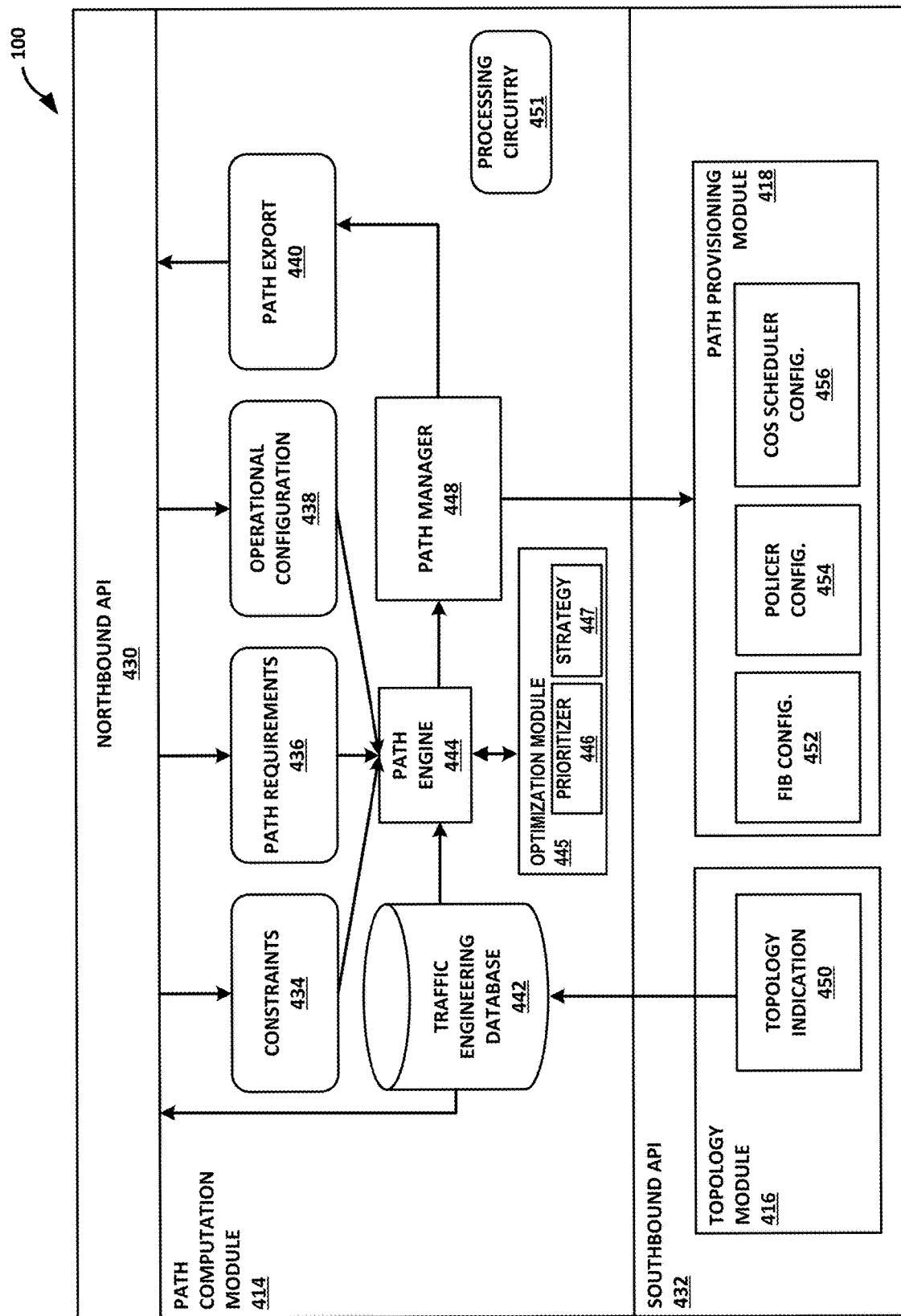
FIG. 4 is a block diagram illustrating an example controller in further detail, according to techniques of this disclosure.

FIG. 4 is a block diagram illustrating an example of a controller in further detail, in accordance with the techniques of this disclosure. Controller 100 may represent an example implementation of controller 100 of FIG. 3. Controller 100 may be or implement a WAN controller, software-defined networking (SDN) controller, and/or path computation element, for instance.

In general, path computation module 414 and path provisioning module 418 of controller 100 may use the protocols to instantiate paths between path computation clients (e.g., routers) in a network. Southbound API 432 allows controller 100 to communicate with SR-enabled and other network nodes, e.g., routers and switches of the network using, for example, ISIS, OSPFv2, BGP-LS, and PCEP protocols. By providing a view of the global network state and bandwidth demand in the network, controller 100 is able to compute optimal paths and provision the network for forwarding using lists of SIDs in an SR paradigm.

In some examples, application services issue path requests to controller 100 to request paths in a path computation domain controlled by controller 100. For example, a path request includes a required bandwidth or other constraint and two endpoints representing an access node and an edge node that communicate over the path computation domain managed by controller 100. Path requests may further specify time/date during which paths must be operational and CoS parameters (for instance, bandwidth required per class for certain paths).

Controller 100 accepts path requests from application services to establish paths between the endpoints over the path computation domain. Paths may be requested for different times and dates and with disparate bandwidth requirements. Controller 100 may reconcile path requests from application services to multiplex requested paths onto the path computation domain based on requested path parameters and anticipated network resource availability.

To intelligently compute and establish paths through the path computation domain, controller 100 includes topology module 416 to maintain topology information (e.g., within traffic engineering database 442) describing available resources of the path computation domain, including access, aggregation, and edge nodes, interfaces thereof, and interconnecting communication links.

Path computation module 414 of controller 100 computes requested paths through the path computation domain. In general, paths are unidirectional. Upon computing paths, path computation module 414 schedules the paths for provisioning by path provisioning module 418. A computed path includes path information usable by path provisioning module 418 to establish the path in the network. Provisioning a path may require path validation prior to committing the path to provide for packet transport.

Further example details of a distributed WAN controller may be found in U.S. Pat. No. 9,450,817, entitled "Software Defined Network Controller," the entire contents of which is incorporated herein by reference. This is merely one example, and controller 100 may compute and provision paths in other ways.

In this example, controller 100 includes northbound and southbound interfaces in the form of northbound application programming interface (API) 430 and southbound API 432. Northbound API 430 includes methods and/or accessible data structures by which, as noted above, application services may configure and request path computation and query established paths within the path computation domain. Southbound API 432 includes methods and/or accessible data structures by which controller 100 receives topology information for the path computation domain and establishes paths by accessing and programming data planes of aggregation nodes and/or access nodes within the path computation domain.

Path computation module 414 includes data structures to store path information for computing and establishing requested paths. These data structures include constraints 434, path requirements 436, operational configuration 438, and path export 440. Application services may invoke northbound API 430 to install/query data from these data structures. Constraints 434 represent a data structure that describes external constraints upon path computation. Constraints 434 allow application services to, e.g., modify link attributes such as metrics before path computation module 414 computes a set of paths.

Application services may modify attributes of a link to effect resulting traffic engineering computations. In such instances, link attributes may override attributes received from topology indication module 450 and remain in effect for the duration of the node/attendant port in the topology. A link edit message to constraints 434 may include a link descriptor specifying a node identifier and port index, together with link attributes specifying a bandwidth, expected time to transmit, shared link group, and fate shared group, for instance. The link edit message may be sent by the controller 100.

Operational configuration 438 represents a data structure that provides configuration information to controller 100 to configure the path computation algorithm with respect to, for example, class of service (CoS) descriptors and detour behaviors. Operational configuration 438 may receive operational configuration information in accordance with CCP. An operational configuration message specifies CoS value, queue depth, queue depth priority, scheduling discipline, over provisioning factors, detour type, path failure mode, and detour path failure mode, for instance. A single CoS profile may be used for the entire path computation domain. Example CoS values are described in U.S. application Ser. No. 13/842,453, filed Mar. 15, 2013, entitled "Aggregation Network with Centralized Control," the entire content of which is incorporated by reference herein. The Service Class assigned to a Class of Service may be independent of the node as an attribute of the path computation domain.

Path export 440 represents an interface that stores path descriptors for all paths currently committed or established in the path computation domain. In response to queries received via northbound API 430, path export 440 returns one or more path descriptors. Queries received may request paths between any two edge and access nodes terminating the path(s). In some examples, path descriptors may be used by application services to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour); bandwidth for each CoS value. In response to receiving the path descriptor, the receiving device may use RSVP-TE to signal an MPLS LSP from the ingress to the egress of the path.

Path requirements 436 represent an interface that receives path requests for paths to be computed by path computation module 436 and provides these path requests (including path requirements) to path engine 444 for computation. Path requirements 436 may be received, or may be handled by the controller. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 416 includes topology indication module 450 to handle topology discovery and, where needed, to maintain control channels between controller 100 and nodes of the path computation domain. Topology indication module 450 may include an interface to describe received topologies to path computation module 414.

Topology indication module 450 may use a topology discovery protocol to describe the path computation domain topology to path computation module 414. In one example, using a cloud control protocol mechanism for topology discovery, topology indication module 450 may receive a list of node neighbors, with each neighbor including a node identifier, local port index, and remote port index, as well as a list of link attributes each specifying a port index, bandwidth, expected time to transmit, shared link group, and fate shared group, for instance.

Topology indication module 450 may communicate with a topology server, such as a routing protocol route reflector, to receive topology information for a network layer of the network. Topology indication module 450 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 450 may in some instances be a passive listener that neither forwards nor originates routing protocol advertisements. In some instances, topology indication module 450 may alternatively, or additionally, execute a topology discovery mechanism such as an interface for an Application-Layer Traffic Optimization (ALTO) service. Topology indication module 450 may therefore receive a digest of topology information collected by a topology server, e.g., an ALTO server, rather than executing a routing protocol to receive routing protocol advertisements directly.

In some examples, topology indication module 450 receives topology information that includes traffic engineering (TE) information. Topology indication module 450 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, indication module 450 executes BGP-TE to receive advertised TE information for inter-autonomous system and other out-of-network links.

Traffic engineering database (TED) 442 stores topology information, received by topology indication module 450, for a network that constitutes a path computation domain for controller 100 to a computer-readable storage medium (not shown). TED 442 may include one or more link-state databases (LSDBs), where link and node data is received in routing protocol advertisements, received from a topology server, and/or discovered by link-layer entities such as an overlay controller and then provided to topology indication module 450. In some instances, an operator may configure traffic engineering or other topology information within TED 442 via a client interface. TED 442 may also store abstract link data (e.g., abstract link data 56 of FIG. 1) describing candidate links for the path computation domain and the shared-risks encountered by these candidate links on their physical (transport) paths, as well as information relevant to path optimization such as the physical length or delay of the link in some cases.

Path engine 444 accepts the current topology snapshot of the path computation domain in the form of TED 442 and computes, using TED 442, traffic-engineered paths between nodes as indicated by configured node-specific policy (constraints 434), such as an SR policy, and/or through dynamic networking with external modules via APIs.

In general, to compute a requested path, path engine 444 determines based on TED 442 and all specified constraints whether there exists a path in the network layer that satisfies the TE specifications for the requested path for the duration of the requested time. Path engine 444 may use the Dijkstra constrained SPF (CSPF) path computation algorithms for identifying satisfactory paths though the path computation domain. If there are no TE constraints, path engine 444 may revert to SPF. If a satisfactory computed path for the requested path exists, path engine 444 provides a path descriptor for the computed path to path manager 448 to establish the path using path provisioning module 418. A path computed by path engine 444 may be referred to as a "computed" path, until such time as path provisioning 418 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 448 establishes computed scheduled paths using path provisioning module 518, which in this instance includes forwarding information base (FIB) configuration module 452 (illustrated as "FIB CONFIG. 452"), policer configuration module 454 (illustrated as "POLICER CONFIG. 454"), and CoS scheduler configuration module 456 (illustrated as "COS SCHEDULER CONFIG. 456"). Paths that have been established within the path computation domain (e.g., logical network 6 of FIG. 1) may be referred to as a "placed" path.

FIB configuration module 452 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 452 may implement, for instance, a software-defined networking (SDN) protocol such as the OpenFlow protocol or the I2RS protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 452 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module 452 establishes communication sessions with aggregation nodes or access nodes to install forwarding information to receive path setup event information, such as confirmation that received forwarding information has been successfully installed or that received forwarding information cannot be installed (indicating FIB configuration failure).

FIB configuration module 452 may add, change (i.e., implicit add), or delete forwarding table entries in accordance with information received from path computation module 414. A FIB configuration message from path computation module 414 to FIB configuration module 452 may specify an event type (add or delete); a node identifier; a path identifier; one or more forwarding table entries each including an ingress port index, ingress label, egress port index, and egress label; and a detour path specifying a path identifier and CoS mode.

Policer configuration module 454 may be invoked by path computation module 414 to request a policer be installed on a particular aggregation node or access node for a particular LSP ingress. As noted above, the FIBs for aggregation nodes or access nodes include policers at LSP ingress. Policer configuration module 454 may receive policer configuration requests. A policer configuration request message may specify an event type (add, change, or delete); a node identifier; an LSP identifier; and, for each class of service, a list of policer information including CoS value, maximum bandwidth, burst, and drop/remark. FIB configuration module 452 configures the policers in accordance with the policer configuration requests.

CoS scheduler configuration module 456 may be invoked by path computation module 414 to request configuration of CoS scheduler on the aggregation nodes or access nodes. CoS scheduler configuration module 456 may receive the CoS scheduler configuration information. A scheduling configuration request message may specify an event type (change); a node identifier; a port identity value (port index); and configuration information specifying bandwidth, queue depth, and scheduling discipline, for instance.

Path engine 444 may compute lists of segment identifiers (SIDs) that satisfy each path in a multipath solution for a segment routing (SR) policy. Path provisioning module 418 may output the lists of SIDs to the SR-enabled network nodes to provision the network to forward traffic along the multipath.

Controller 100 includes a hardware environment including processing circuitry 451 for executing machine-readable software instructions for implementing modules, interfaces, managers, and other components illustrated and described with respect to controller 100. The components may be implemented solely in software, or hardware, or may be implemented as a combination of software, hardware, or firmware. For example, controller 100 may include one or more processors comprising processing circuitry 451 that execute program code in the form of software instructions. In that case, the various software components/modules of may comprise executable instructions stored on a computer-readable storage medium, such as computer memory or hard disk (not shown).

Figure 7:
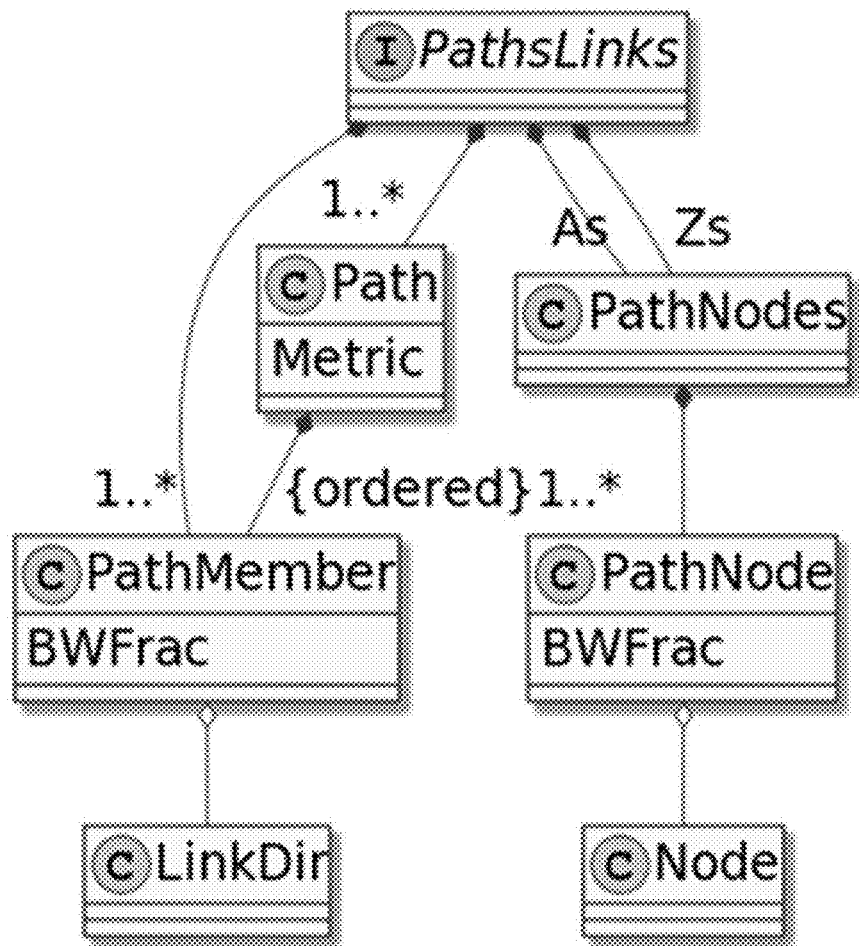
FIG. 7 is a block diagram illustrating a data model for determining the total usage by a multipath, in accordance with the techniques described in this disclosure.

In accordance with the techniques described in this disclosure, path computation module 414 includes an optimization module 445 to provide optimization of segment routing-enabled multipaths. Optimization module 445 may represent an example implementation of optimization module 57 of FIG. 1 and optimization module 117 of FIG. 3. Optimization module 117 may implement the data model for determining the total usage by a multipath, such as the data model for "PathsLinks" shown in FIG. 7.

Figure 8:
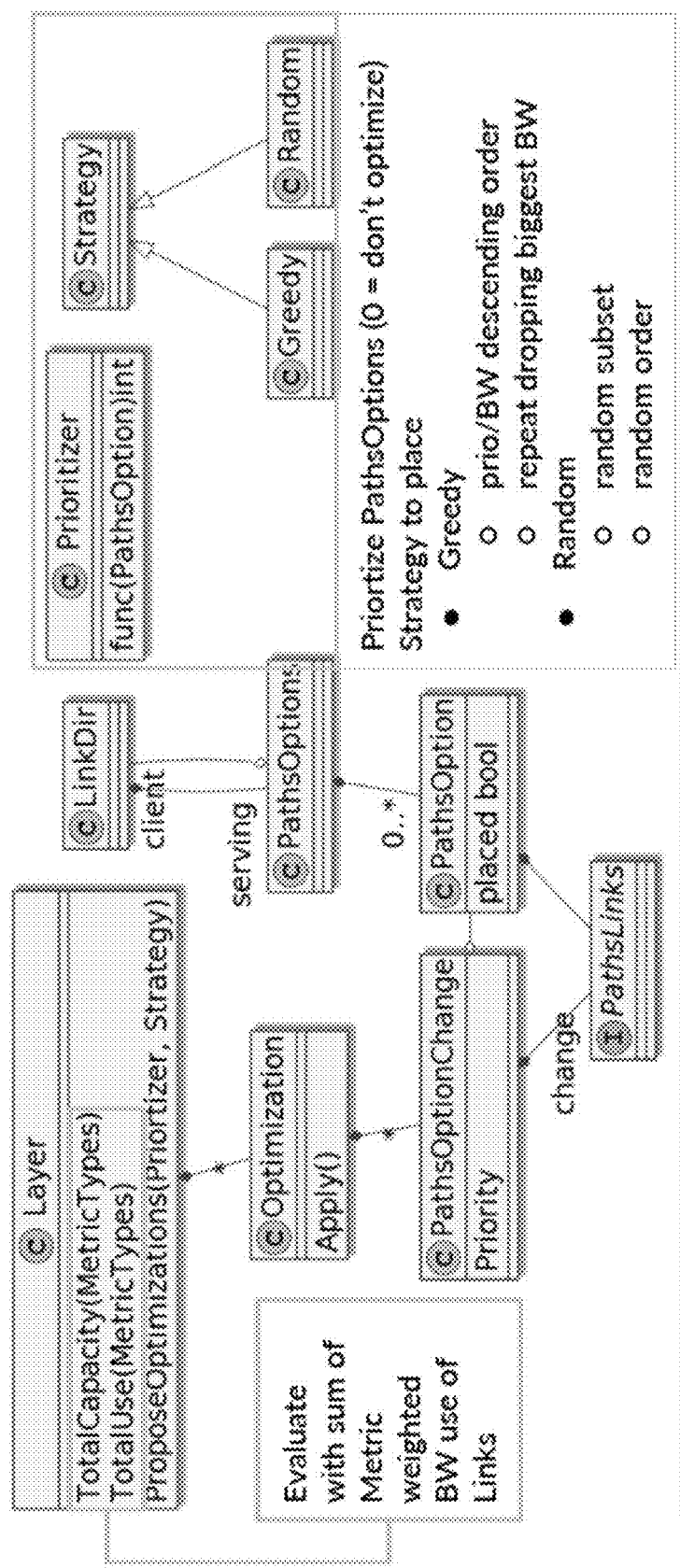
FIG. 8 is a block diagram illustrating a data model for optimizing a segment routing-enabled multipath network, in accordance with the techniques described in this disclosure.

In this example, path engine 444 may use optimization module 445 to optimize segment routing-enabled multipaths. Optimization module 445 may implement a data model for optimizing segment routing-enabled multipaths, such as the data model shown in FIG. 8. For example, optimization module 445 may use the data (e.g., traffic engineering information and/or abstract link data stored in TED 442) describing links used to implement paths of multipaths to determine a total usage of a metric (e.g., bandwidth) by multipaths provisioned in logical network 6. Optimization module 445 may compute, for each of the links used to implement paths of multipaths, the usage of the metric of the link by all paths of the multipaths to compute a total usage of the metric by the multipaths. As described above, optimization module 445 may implement one or more heuristic algorithms and/or strategies ("strategy 447") to define the order in which to compute and place of one or more paths of the multipaths. Strategy 447 may include algorithms and/or strategies such as a greedy algorithm, a randomization function, or any other algorithm and/or strategy to order the computation and placement of paths such as based on priorities assigned to the paths.

Path engine 444 may compute and place paths of a second plurality of multipaths, to a model of the logical network, in an order based on the implementation of strategy 447. Optimization module 445 may then compute the total usage by the second plurality of multipaths, and provision the second plurality of multipaths if the total usage of a metric by the second plurality of multipaths is less than the total usage of the metric by the first plurality of multipaths. If the total usage of a metric by the second plurality of multipaths is not less than the total usage of the metric by the first plurality of multipaths, optimization module 445 may leave the multipaths provisioned in the logical network unchanged and/or perform a next iteration of the heuristic algorithm and/or strategy.

In some examples, optimization module 445 may have a timing module (not shown) to control the duration in which to perform the optimization process. For example, optimization module 445 may, if a time limit set by the timing module has not been exceeded, perform a next iteration of the strategy 447, e.g., to re-order the compute and placement of the paths of the multipaths for the next iteration. If a time limit set by the timing module has been exceeded and no optimization scenario is found, the multipaths provisioned in the network layer are left unchanged.

In some examples, optimization module 445 includes a prioritizer module 446 to assign priorities to one or more multipaths to control which of the multipaths provisioned in the network layer are to be optimized (or not optimized). For example, optimization module 445 may use prioritizer module 446 to assign priorities to one or more multipaths provisioned in the logical network 6 to prevent any changes or modifications to these multipaths. Alternatively, or additionally, prioritizer module 446 may assign priorities to one or more multipaths provisioned in the logical network 6 to enable changes or modifications to the computation and placement of these multipaths.

In some examples, optimization module 445 may additionally, or alternatively, determine the quality of the multipaths. For example, multipaths that are computed and placed earlier to the model for logical network 6 may be more robust with respect to link failures (e.g., have many alternative paths), and the multipaths that are computed and placed later to the model for logical network 6 may be left with a smaller number of paths. In these examples, optimization module 445 may identify, from data structures of the path computation module 414 that store path information for computed paths, the multipaths with a larger number of paths from which optimization module 445 may move link bandwidth to multipaths with fewer paths or provide restrictions to the computation and placement of multipaths that occur earlier. For instance, optimization module 445 may compute and place all multipaths with an equitable distribution of resources and/or number of paths to avoid instances in which some multipaths have a larger number of paths and some multipaths have a smaller number of paths.

Figure 5:
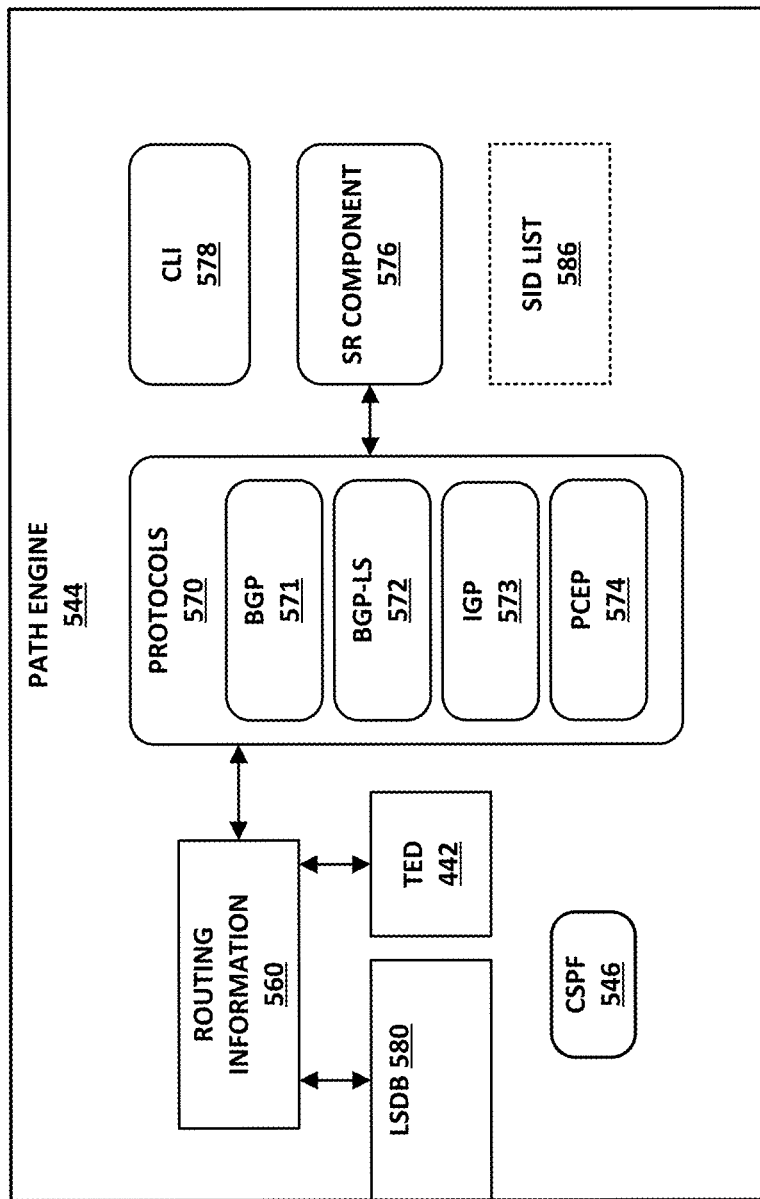
FIG. 5 is a block diagram illustrating an example implementation of a path engine of a controller in further detail, according to techniques of this disclosure.

FIG. 5 is a block diagram illustrating an example implementation of path engine 444 in further detail. Path engine 444 may execute various routing protocols 570 at different layers of a network stack. Path engine 444 is responsible for the maintenance of routing information 560 to reflect the current topology of a network. Routing information 560 may include TED 442 and LSDB 580. In particular, routing protocols periodically update routing information 560 to accurately reflect the topology of the network and other entities based on routing protocol messages received by controller 100. The protocols may be software processes executing on one or more processors. For example, path engine 444 includes network protocols that operate at a network layer of the network stack, which are typically implemented as executable software instructions. The operations may overlap or instead by performed by topology module 416.

Protocols 570 may include Border Gateway Protocol (BGP) 571 to exchange routing and reachability information among routing domains in a network and BGP-LS 572 to exchange traffic engineering and segment routing policy information among routing domains in the network. Protocols 570 may also include IGP 573 to exchange link state information and facilitate forwarding of packets or other data units between routers within each of the routing domains. In some examples, IGP 573 may include an IS-IS routing protocol that implements an IGP for exchanging routing and reachability information within a routing domain IGP 573 may include IS-IS extensions that support traffic engineering. In some examples, protocols 570 may include both an OSPF component and an IS-IS component. Protocols 570 may also include configuration protocols. For example, protocols 570 may include PCEP 574 or NETCONF.

Path engine 444 includes an SR component that to implement techniques described herein to generate lists of SIDs for a multiple. SID list 586 includes one or more SID lists generated in this way, which may be provisioned by controller 100 to a network for segment routing tunnel. An ingress router may use the SIDs to steer a packet through a controlled set of instructions, called segments, by prepending the packet with a SID label stack in a segment routing header or MPLS label stack. Protocols 570 may include other routing protocols (not shown), such as Label Distribution Protocol (LDP), Resource Reservation Protocol with Traffic Extensions (RSVP-TE), routing information protocol (RIP), or other network protocols.

In this example, path engine 444 includes a command line interface (CLI) 578 that provides access for an administrator to monitor, configure, or otherwise manage controller 100. An administrator may, via CLI 578, configure aspects of controller 100, including aspects relating to routing as well as computing and provisioning lists of SIDs for multipaths. CLI 578 may enable specifying source, destination, user constraints, preferences, SR policies, and other configurable information.

Figure 6:
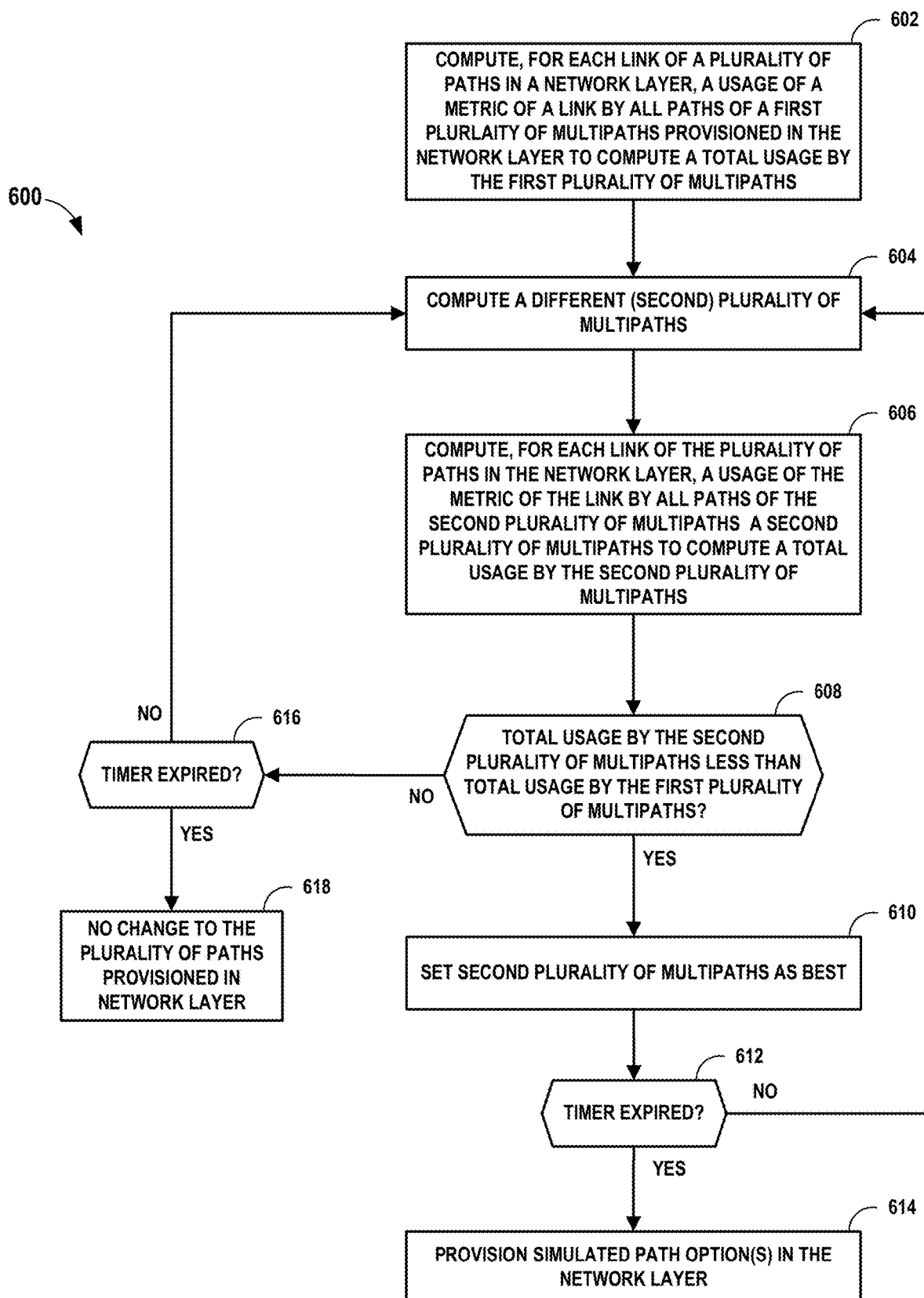
FIG. 6 is a flow diagram illustrating an example operation of a computing device, in accordance with one or more techniques of this disclosure.

FIG. 6 is a flow diagram illustrating an example operation of a computing device, in accordance with the techniques of this disclosure. The operation of the computing device is described with respect to controller 52 of FIG. 1 and controller 100 of FIGS. 2 and 3. Although described with respect to controller 52, the operation of the computing device may apply to the operation of optimization module 57 of FIG. 1, optimization module 117 of FIG. 3, and/or optimization module 445 of FIG. 4.

In the example of FIG. 6, controller 52 of FIG. 1 may compute, for each link of a plurality of links in a network layer, a usage of a metric of the link by all paths of a first plurality of multipaths provisioned in the network layer to compute a total usage by the first plurality of multipaths (602). For example, controller 52 may obtain traffic engineering information 21 including information such as administrative weights and available bandwidth per priority level for links, and/or abstract link data 56 describing the shared-risks encountered by links 9 of multipaths provisioned in logical network 6 on their physical (transport) paths and/or information as to the physical length or delay of the links. Based on this information, optimization module 57 may compute and place a first plurality of multipaths to a model of the network layer in a first order, wherein the first plurality of multipaths correspond to different respective segment routing policies. Controller 52 may use the traffic engineering information 21 and/or abstract link data 56 to compute a total bandwidth usage by the first plurality of multipaths such as by using the function described in FIG. 2. In some examples, controller 52 may alternatively, or additionally, compute the delay of the first plurality of multipaths.

Controller 52 may compute a different ("second") plurality of multipaths for the respective segment routing policies (604). For example, controller 52 may compute and place the second plurality of multipaths to the model of the network layer in a second, different order. In some examples, controller 52 may implement one or more heuristic algorithms and/or strategies to re-order the computation and placement of the one or more paths of the multipaths. The heuristic algorithms and/or strategies may include a greedy algorithm, a randomization function, or any other algorithm and/or strategy to re-order the placement of paths in the network layer. In some examples, controller 52 may assign respective priorities to one or more multipaths to optimize (or not optimize) the multipaths. For example, controller 52 may assign priorities to one or more multipaths provisioned in the logical network 6 to prevent any changes or modifications to these multipaths. Alternatively, or additionally, optimization module 57 may assign priorities to one or more multipaths provisioned in the logical network 6 to enable changes or modifications to the computation and placement of these multipaths.

Controller 52 may compute, for each link of the plurality of links, a usage of the metric of the link by all paths of the second plurality of multipaths to compute a total usage by the second plurality of multipaths (606). Controller 52 may determine whether the total usage by the second plurality of multipaths is less than the total usage by the first plurality of multipaths (608). If controller 52 determines that the total usage by the second plurality of multipaths is less than the total usage by the first plurality of multipaths ("YES" of STEP 608), then controller 52 may set the second plurality of multipaths as the best plurality of multipaths (610). In some examples, controller 52 may include a timer configured with a time limit in which controller 52 is to perform the optimization process as described above. For example, if the timer has expired ("YES" of STEP 612), controller 52 may cause controller 52 to provision the second plurality of multipaths in the network layer (614). If the timer has not expired ("NO" of STEP 612), controller 52 may, in some examples, perform a next iteration of the algorithm and/or strategy (e.g., compute and place the paths of the multipaths in a different order) (604) and evaluate the computed plurality of multipaths to determine whether the computed plurality of multipaths has improved. That is, controller 52 may continue to generate candidate changes to the multipaths and keep track of the best option until the timer is expired.

If controller 52 determines that the total usage by the second plurality of multipaths is not less than the total usage by the first plurality of multipaths ("NO" of STEP 608), optimization module 57 may determine whether the timer has expired (616). For example, if the timer has not expired ("NO" of STEP 616), optimization module 57 may perform a next iteration of the algorithm and/or strategy (e.g., compute and place the paths of the multipaths in a different order) (604). In some examples, if the timer has expired ("YES" of STEP 616) and no optimization scenario is found, then controller 52 does not change the first plurality of multipaths provisioned in the network layer (618).

In some examples, controller 52 may additionally, or alternatively to the determination of the total usage of a metric, determine the quality of the multipaths. For example, multipaths that are computed and placed earlier to the model for logical network 6 may be more robust with respect to link failures (e.g., have many alternative paths), and the multipaths that are computed and placed later to the model for logical network 6 may be left with a smaller number of paths. In these examples, controller 52 may determine the quality of the first plurality of multipaths (e.g., determine whether the first plurality of multipaths has an unequitable distribution of paths). Controller 52 may determine that the first plurality of multipaths has an unequitable number of paths. In response to determining that the first plurality of multipaths has an unequitable number of paths, controller 52 may compute a different (third) plurality of multipaths for the respective segment routing policies, wherein computing the third plurality of multipaths comprises computing and placing, to the model of the network layer, the multipaths of the third plurality of multipaths in a third, different order than the multipaths of the first plurality of multipaths. Controller 52 may, in response to determining that the third plurality of multipaths has an equitable number of paths, provision the third plurality of multipaths in the network layer.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium or computer-readable storage device may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
by a computing system having a model of a multi-layer network comprising a network layer having a plurality of links, for each link of the plurality of links, computing a usage of a metric of the link by all paths of a first plurality of multipaths provisioned in the network layer to compute a total usage by the first plurality of multipaths,
wherein multipaths of the first plurality of multipaths have been computed and placed to a model of the network layer in a first order, and
wherein the multipaths of the first plurality of multipaths correspond to different, respective segment routing policies;
computing, by the computing system, a second plurality of multipaths for the respective segment routing policies, wherein computing the second plurality of multipaths comprises computing and placing, to the model of the network layer, multipaths of the second plurality of multipaths in a second, different order than the multipaths of the first plurality of multipaths;
computing, by the computing system, for each link of the plurality of links, a usage of the metric of the link by all paths of the second plurality of multipaths to compute a total usage by the second plurality of multipaths; and
in response to determining that the total usage by the second plurality of multipaths is less than the total usage by the first plurality of multipaths, provisioning, by the computing system, the second plurality of multipaths in the network layer.

2. The method of claim 1, wherein computing the total usage by the first plurality of multipaths comprises computing a total weighted bandwidth usage and a total weighted bandwidth capacity of the first plurality of multipaths.

3. The method of claim 1, wherein computing the usage of the metric of the link by all paths of the first plurality of multipaths comprises:
determining a fraction of bandwidth of the link used by a particular path of the first plurality of multipaths and a bandwidth capacity available to the link for the first plurality of multipaths.

4. The method of claim 1, wherein computing and placing to the model of the network layer, the multipaths of the second plurality of paths multipaths in the second, different order to generate the second plurality of multipaths is based on a greedy algorithm.

5. The method of claim 1, wherein computing and placing to the model of the network layer, the multipaths of the second plurality of multipaths in the second, different order to generate the second plurality of multipaths is based on a random order.

6. The method of claim 1, wherein computing and placing to the model of the network layer, the multipaths of the second plurality of multipaths in the second, different order to generate the second plurality of multipaths is based on respective priorities assigned to the segment routing policies.

7. The method of claim 6, wherein the respective priorities assigned to the segment routing policies comprises at least one of a priority to enable modification of corresponding multipaths of the first plurality of multipaths or a priority to prevent modification of corresponding multipaths of the first plurality of multipaths.

8. The method of claim 1, further comprising:
in response to determining that the total usage by the second plurality of multipaths is not less than the total usage by the first plurality of multipaths, leaving the first plurality of multipaths provisioned in the network layer unchanged.

9. The method of claim 1,
wherein the multi-layer network comprises a transport layer, and
wherein computing the usage of the metric of the link by all paths of the first plurality of multipaths comprises obtaining a usage of the metric of one or more links in the transport layer mapped to the paths of the first plurality of multipaths.

10. A computing device of a multi-layer network comprising a network layer having a plurality of links, comprising:
a memory; and
processing circuitry in communication with the memory, the processing circuitry and memory being configured to:
for each link of the plurality of links, compute a usage of a metric of the link by all paths of a first plurality of multipaths provisioned in the network layer to compute a total usage by the first plurality of multipaths,
wherein multipaths of the first plurality of multipaths have been computed and placed to a model of the network layer in a first order, and
wherein the multipaths of the first plurality of multipaths correspond to different, respective segment routing policies;
compute a second plurality of multipaths for the respective segment routing policies, wherein computing the second plurality of multipaths comprises computing and placing, to the model of the network layer, multipaths of the second plurality of multipaths in a second, different order than the multipaths of the first plurality of multipaths; and in response to determining that the total usage by the second plurality of multipaths is less than the total usage by the first plurality of multipaths, provision the second plurality of multipaths in the network layer.

11. The computing device of claim 10, wherein to compute the total usage by the first plurality of multipaths, the processing circuitry is further configured to:

compute a total weighted bandwidth usage and a total weighted bandwidth capacity of the first plurality of multipaths.

12. The computing device of claim 10, wherein to compute the total usage by the first plurality of multipaths, the processing circuitry is further configured to:

determine a fraction of bandwidth of the link used by a particular path of the first plurality of multipaths and a bandwidth capacity available to the link for the plurality of multipaths.

13. The computing device of claim 10, wherein to compute and place to the model of network layer, the multipaths of the second plurality of multipaths in the second, different order to generate the second plurality of multipaths is based on a greedy algorithm.

14. The computing device of claim 10, wherein to compute and place to the model of network layer, the multipaths of the second plurality of multipaths in the second, different order to generate the second plurality of multipaths is based on a random order.

15. The computing device of claim 10, wherein to compute and place to the model of the network layer, the multipaths of the second plurality of multipaths in the second, different order to generate the second plurality of multipaths is based on respective priorities assigned to the segment routing policies.

16. The computing device of claim 15, wherein the respective priorities assigned to the segment routing policies comprises at least one of a priority to enable modification of corresponding multipaths of the first plurality of multipaths or a priority to prevent modification of corresponding multipaths of the first plurality of multipaths.

17. The computing device of claim 10, wherein the processing circuitry is further configured to:

in response to determining that the total usage by the second plurality of multipaths is not less than the total usage by the first plurality of multipaths, leave the first plurality of multipaths provisioned in the network layer unchanged.

18. The computing device of claim 10, wherein the multi-layer network comprises a transport layer, and wherein to compute the usage of the metric of the link by all paths of the first plurality of multipaths, the processing circuitry is further configured to obtain a usage of the metric of one or more links in the transport layer mapped to the paths of the first plurality of multipaths.

19. The computing device of claim 10, wherein the processing circuitry is further configured to:

determine that the first plurality of multipaths has an unequitable number of paths; in response to determining that the first plurality of multipaths has an unequitable number of paths, compute a third plurality of multipaths for the respective segment routing policies, wherein computing the third plurality of multipaths comprises computing and placing, to the model of the network layer, the multipaths of the third plurality of multipaths in a third, different order than the multipaths of the first plurality of multipaths; and in response to determining that the third plurality of multipaths has an equitable number of paths, provision the third plurality of multipaths in the network layer.

20. A non-transitory computer-readable storage medium encoded with instructions that, when executed, cause one or more programmable processors to:

for each link of a plurality of links of a network layer of a multi-layer network, compute a usage of a metric of the link by all paths of a first plurality of multipaths provisioned in the network layer to compute a total usage by the first plurality of multipaths, wherein multipaths of the first plurality of multipaths have been computed and placed to a model of the network layer in a first order, and wherein the multipaths of the first plurality of multipaths correspond to different, respective segment routing policies;

compute a second plurality of multipaths for the respective segment routing policies, wherein computing the second plurality of multipaths comprises computing and placing, to the model of the network layer, multipaths of the second plurality of multipaths in a second, different order than the multipaths of the first plurality of multipaths; and in response to determining that the total usage by the second plurality of multipaths is less than the total usage by the first plurality of multipaths, provision the second plurality of multipaths in the network layer.

\* \* \* \* \*